(12) United States Patent
Garcia et al.

(10) Patent No.: US 10,339,027 B2
(45) Date of Patent: Jul. 2, 2019

(54) AUTOMATION IDENTIFICATION DIAGNOSTIC TOOL

(71) Applicant: Accenture Global Solutions Limited, Dublin (IE)

(72) Inventors: Maria Encarnacion Garcia, Manila (PH); Rodolfo Catral, Jr., Rizal (PH); Genesis Navarro, Caloocan City (PH); Clarris C. Tolentino, Pampanga (PH); Manisha Dubey, Bangalore (IN); Rajneesh Soni, Delhi (IN); Phani Kumar Chandu, Charlotte, NC (US); Winston O. Cruz, Manila (PH); Muhammad J. Salas, Metro Manila (PH)

(73) Assignee: Accenture Global Solutions Limited, Dublin (IE)

( * ) Notice: Subject to any disclaimer, the term of this patent is extended or adjusted under 35 U.S.C. 154(b) by 125 days.

(21) Appl. No.: 15/625,481

(22) Filed: Jun. 16, 2017

(65) Prior Publication Data
US 2018/0074931 A1 Mar. 15, 2018

(30) Foreign Application Priority Data

Sep. 6, 2016 (IN) .............................. 201641030353
Apr. 5, 2017 (IN) .............................. 201641030353

(51) Int. Cl.
| | | |
|---|---|---|
| G06F 3/00 | (2006.01) | |
| G06F 9/44 | (2018.01) | |
| G06F 9/46 | (2006.01) | |
| G06F 13/00 | (2006.01) | |
| G06F 11/34 | (2006.01) | |
| G06F 9/451 | (2018.01) | |
| G06Q 10/10 | (2012.01) | |

(52) U.S. Cl.
CPC .......... *G06F 11/3414* (2013.01); *G06F 9/451* (2018.02); *G06Q 10/10* (2013.01)

(58) Field of Classification Search
CPC ................................................... G06F 11/3414
USPC .......................................................... 719/318
See application file for complete search history.

(56) References Cited

U.S. PATENT DOCUMENTS

| | | |
|---|---|---|
| 2008/0282160 A1 | 11/2008 | Tonnison et al. |
| 2016/0117341 A1 | 4/2016 | Zhang et al. |

FOREIGN PATENT DOCUMENTS

WO    WO 2017/001560    1/2017

OTHER PUBLICATIONS

Examination Report No. 4 for Australian Application No. 2017204500, dated Nov. 6, 2018, pp. 1-3.
Australia Patent Office, Examination Report No. 1 for Australia Application No. 2017204500 dated Nov. 10, 2017, 8 pages.
Australian Patent Office, Examination Report No. 2, for Australian Patent Application No. 2017204500, dated Mar. 27, 2018 pp. 1-6.
Examination Report No. 3 for Australian Application No. 2017204500 dated Jul. 19, 2018 pp. 1-5.

*Primary Examiner* — Timothy A Mudrick
(74) *Attorney, Agent, or Firm* — Brinks Gilson & Lione

(57) ABSTRACT

An automation identification diagnostic tool (AIDT) is disclosed that records and analyzes actions within a program that are taken by an agent to accomplish certain tasks. By recording the action steps to accomplish a task in a recording session data file, the AIDT is then able to analyze the recording session data file to identify steps for conversion to automated tasks.

18 Claims, 19 Drawing Sheets

FIG. 10

AIDT Analysis

Select User: rodolfo.m.catral

Select Date: 03/28/2016    [Generate]

[Summary] [Detailed]

Transaction: Overall

Step Details

| Step | Application | Action ON | Action | Start Time | End Time | Automatable |
|---|---|---|---|---|---|---|
| Step 1 | | Left click | Mouse Event | 03/28/16 2:13:26 PM | 03/28/16 2:13:28 PM | Y |
| Step 2 | Internet explorer | Left click Global Productivity | Mouse Event | 03/28/16 2:13:28 PM | 03/28/16 2:13:42 PM | Y |
| Step 3 | | User Entered... | Keystrokes | 03/28/16 2:13:42 PM | 03/28/16 2:13:43 PM | P |
| Step 4 | Internet explorer | Left click usd to php-Google | Mouse Event | 03/28/16 2:13:42 PM | 03/28/16 2:13:43 PM | Y |
| Step 5 | | User Entered... | Copy | 03/28/16 2:13:43 PM | 03/28/16 2:13:45 PM | Y |
| Step 6 | | Left click Start | Mouse Event | 03/28/16 2:13:43 PM | 03/28/16 2:13:45 PM | Y |
| Step 7 | | Left click Start menu | Mouse Event | 03/28/16 2:13:45 PM | 03/28/16 2:13:48 PM | Y |
| Step 8 | Excel | Left click Excel | Mouse Event | 03/28/16 2:13:48 PM | 03/28/16 2:13:51 PM | Y |

Productivity Tool    Privacy Policy|Terms of Use| Contact and Feedback|©2014 Accenture All Rights Reserved
Build Version: 2.11.14.13

1200 ⟶

| Action | Action Category | Automatable |
|---|---|---|
| Left Click | Mouse Event | Yes |
| Right Click | Mouse Event | Yes |
| User Entered Less than or Equal to 15 Characters | Keypress | Potential |
| User Entered I have Entered a Paragraph with More than 15 Characters | Keypress | No |
| User Entered [Control]c[/Control] | Copy | Yes |
| User Entered [Control]v[/Control] | Paste | Yes |
| User Entered [Control]c[/Control] and did not Paste Later on | Copy | No |
| User Entered [Alt][Tab] | Switching Application | Yes |
| Find and Replace | Find and Replace | Yes |

FIG. 12

AUTOMATION IDENTIFICATION DIAGNOSTIC TOOL

CROSS-REFERENCE TO RELATED APPLICATION(S)

This application claims priority to Indian Provisional Patent Application No. 201641030353, filed Sep. 6, 2016, and Indian Non-Provisional Patent Application No. 201641030353, filed Apr. 5, 2017, the entirety of which are hereby incorporated by reference herein.

BACKGROUND

Due to the lack of available technology to improve the efficiency of certain manual tasks or to automate these tasks, many enterprises still rely on manual processes fulfilled by agents to operate.

Accordingly, it is desirable to create advancements in computer and networking technology for automating manual processes and identifying areas for improved efficiencies.

DESCRIPTION OF THE FIGURES

FIG. 10 illustrates another exemplary graphical user interface of the automation identification diagnostic tool.

FIG. 12 illustrates an exemplary table of rules for identifying automatable processes.

DETAILED DESCRIPTION

Figure 1:
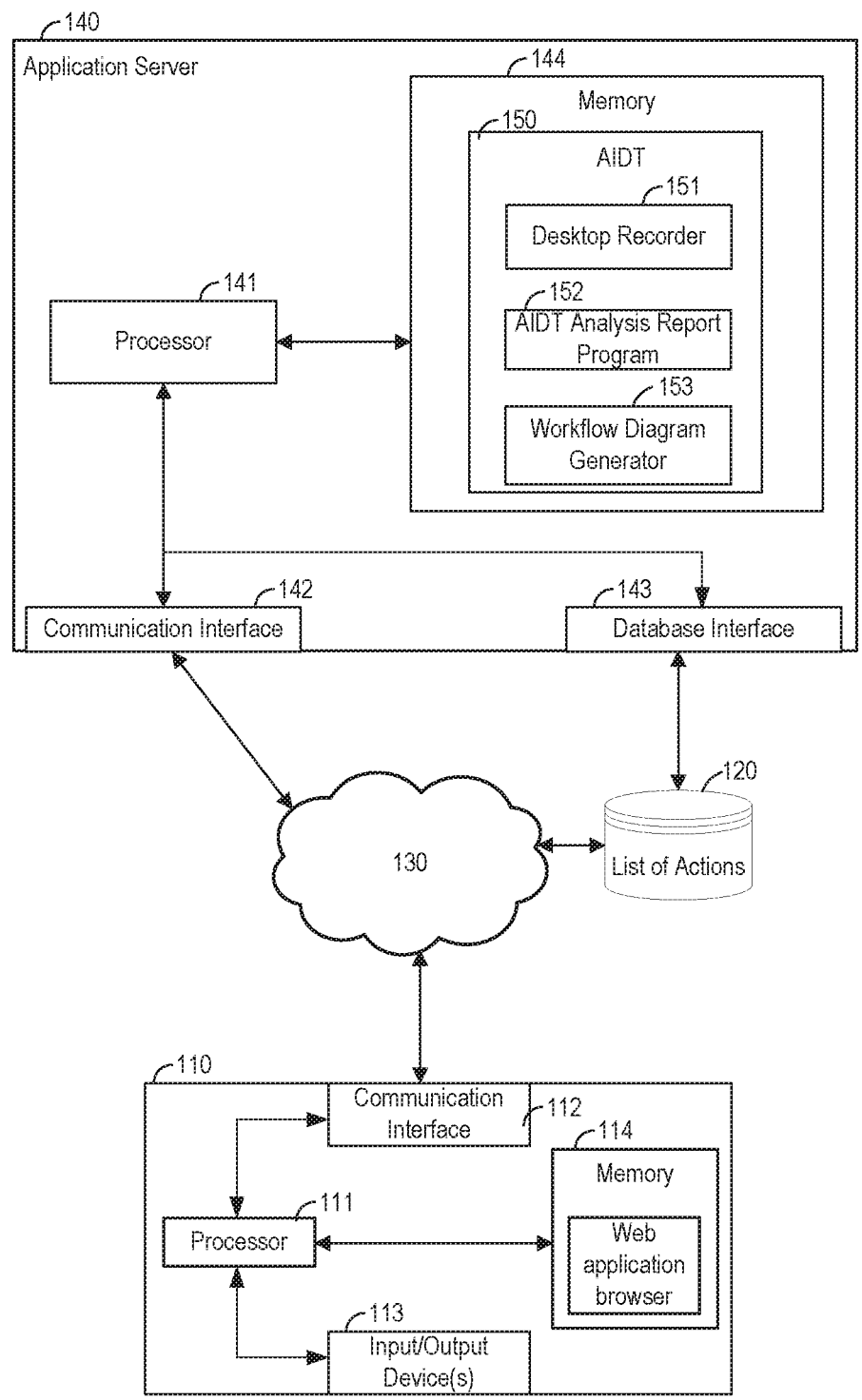
FIG. 1 illustrates an exemplary application platform system for implementing an automation identification diagnostic tool.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

An automated identification diagnostic tool (AIDT) is disclosed for recording manual processes implemented on a user's desktop computer, analyzing the recorded manual processes to identify manual processes that may potentially be automated, and generating a report that identifies manual processes that may be automated, identifies manual processes that may not be automated, and identifies manual processes that may be automated. The AIDT may be implemented as a web-based application configured for remote users to access the AIDT running on a server or other cloud location. The AIDT may also be implemented as a desktop application that is installed locally on a user's computer and is capable of running offline within a local computing environment.

The AIDT is comprised of at least three components: 1) A desktop recorder, 2) an AIDT analyzer, and 3) a workflow diagram generator. According to some embodiments, the workflow diagram generator may create a workflow diagram, as described herein. In addition or alternatively, according to some embodiments the workflow diagram generator may automatically create automation code (e.g. Solution Design Document (SDD), Process Design Instruction (PDI), Object Design Instruction (ODI) and business process (BP) code) in addition to, or instead of, the workflow diagram. The automation code may be generated to be run by a particular Robot Process Automation (RPA) tool to automate a particular process, where the RPA tool has been selected by the AIDT based on an analysis by the AIDT of past performance of the selected RPA tool in automating the particular process.

The Desktop Recorder is activated by an agent for recording manual processes implemented by the agent on their computer that is desired to be analyzed for automation. The Desktop Recorder records the agent's keyboard actions (e.g., mouse clicks and x & y coordinates; keyboard presses; desktop screen object detection (e.g., identify buttons and text fields selected by user)) as well as identify the application currently being accessed and receiving the agent's keyboard actions. The Desktop Recorder may further measure a length of time elapsed for the process, measure a length of time elapsed for each step in the process, count a number of steps in the process, and provide a graphical user interface for controlling the recording stop, start, and pause functions. The Desktop Recorder may generate a data file that describes the information recorded by the Desktop Recorder, where the data file may be forwarded to the AIDT Analyzer for automation analysis. The data file may include, for example, a Solution Design Document (SDD), a Process Design Instruction (PDI), an Object Design Instruction (ODI), or business process (BP) code.

Each detected keyboard activity may further cause the Desktop Recorder to capture a screenshot of the graphical user interface display at the time the keyboard activity was detected. The keyboard activity may be, for example, related to the activation of one or more keys on a keyboard (e.g., a function key, or enter key), or may further refer to a mouse click (e.g., left or right mouse click). Each screenshot captured by the Desktop Recorder may include identification information relating the screenshot to the corresponding keyboard activity that caused the screenshot to be captured and/or the corresponding application receiving the keyboard activity. According to some embodiments, a cognitive bot may be utilized within the Desktop Recorder to capture a portion of the desktop screen surrounding an area where the mouse click occurred, where the portion of the desktop screen that is captured by the cognitive bot is less than the entire desktop screen image. For a task that requires many steps to implement, this cognitive bot running within the Desktop Recorder may result in an overall memory storage savings as the enhanced screenshot being captured will be significantly smaller than the full desktop images that may be captured without the cognitive bot. The desktop area surrounding the mouse click captured by the cognitive bot may be a predetermined area set by the cognitive bot universally for all mouse clicks. In addition or alternatively, the cognitive bot may set the captured desktop area surrounding the mouse click dependent on the current application running during the mouse click (e.g., different predetermined area assigned for specific applications), or the object being clicked (e.g., different predetermined area assigned to different detected objects being clicked). For example, the cognitive bot may set the captured desktop area surrounding the mouse click to ensure that an object being clicked by the mouse click is captured in full by the captured desktop area. The Desktop Recorder may also capture a screenshot based on the detection of a specific predetermined keyboard activity (e.g., mouse click and function keys selected in combination)

The data file and screenshots may be automatically gathered by the Desktop Recorder as the Desktop Recorder monitors the information related to the detected keyboard activity. The data file and screenshots may be automatically combined into a discovery document that describes the keyboard activity of the user. The Desktop Recorder may further generate the following documents and include them into the discovery document: a process design document, a solution design document, an object design instruction, and/or a process design instruction may further be automatically created and included as part of the discovery document.

The manual process being recorded may correspond to a specific task available while using a specific application. For example, the process may relate to an invoice payment task using the Excel application. Multiple different instances of the invoice payment task being implemented, as accomplished by the same or different agent, may be recorded by the Desktop Recorder for analysis by the AIDT Analyzer.

The AIDT Analyzer receives the discovery document and runs an analysis on the discovery document to determine which of the recorded processes are capable of being automated. For example, the recorded processes in the discovery document may be compared against a list of predetermined processes that are known to be automatable. The list of predetermined processes may include, for example, the list described by table 1200 in FIG. 12.

When a recorded process in the discovery document matches a process in the list of predetermined processes that are known to be automatable, the AIDT Analyzer may tag the recorded process as being automatable. When a recorded process does not match up to a process in the list of predetermined processes that are known to be automatable, the AIDT Analyzer may tag the recorded process as not being automatable. There may also be instances where a recorded process is determined by the AIDT Analyzer as being potentially automatable. Such recorded processes may be tagged as being possibly automatable. As additional instances of the recorded processes (that includes repeated instances of the process tagged as being possibly automatable) are analyzed by the AIDT Analyzer, additional information for making a final determination as to whether the process tagged as being possibly automatable is automatable or not.

Figure 8:
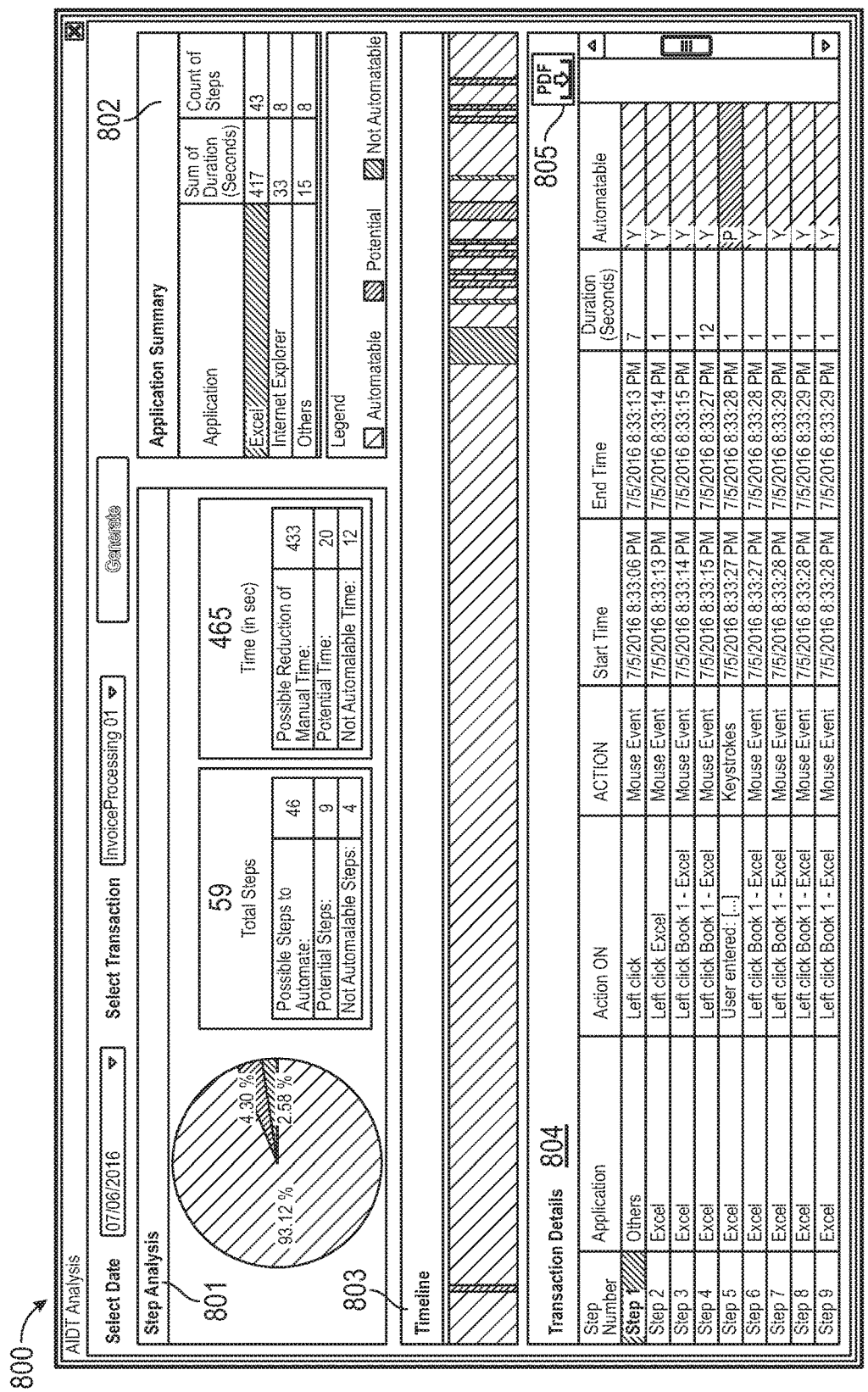
FIG. 8 illustrates another exemplary graphical user interface of the automation identification diagnostic tool.
Figure 9:
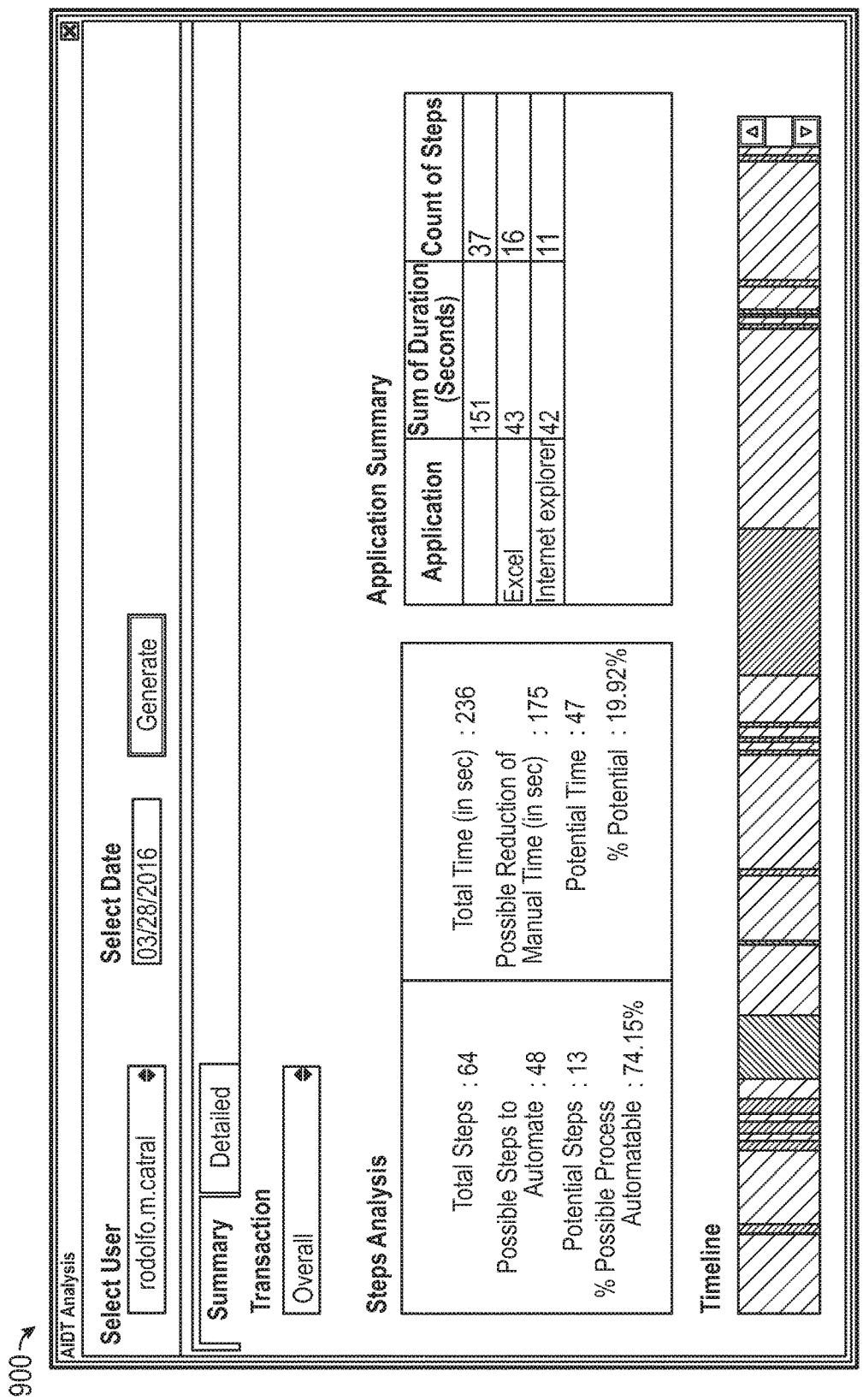
FIG. 9 illustrates another exemplary graphical user interface of the automation identification diagnostic tool.

After running the analysis on the discovery document, the AIDT Analyzer may display a graphical user interface (GUI) describing the results of the analysis. An exemplary version of the resulting GUI is shown by first exemplary GUI 800 in FIG. 8. Another exemplary version of the resulting GUI is shown by second exemplary GUI 900 in FIG. 9.

Figure 11:
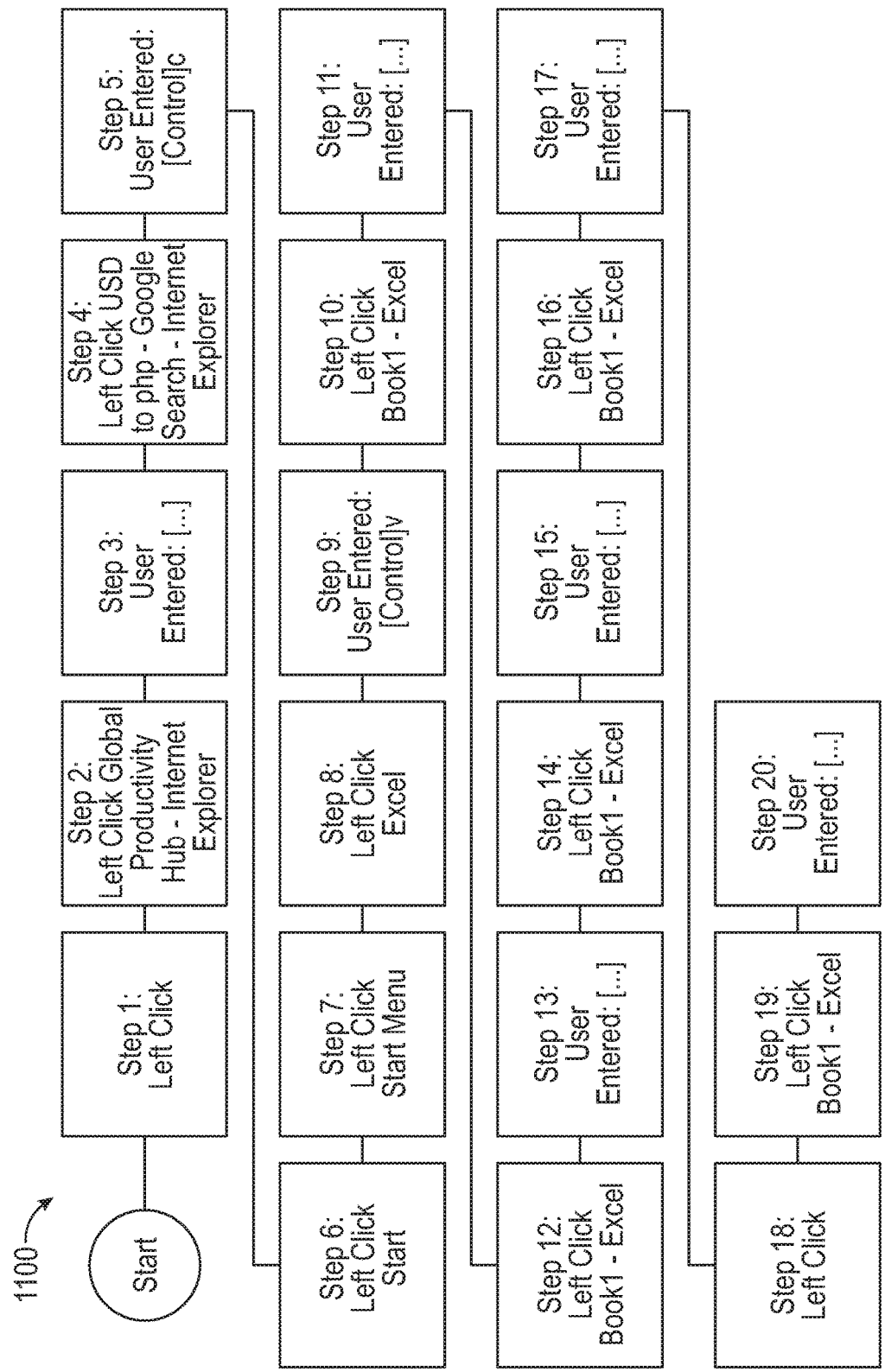
FIG. 11 illustrates an exemplary workflow diagram output of the automation identification diagnostic tool.

An output of the AIDT Analyzer may include a text file that describes each of the automatable processes. An output of the AIDT Analyzer may also include an encrypted data file that includes the information displayed in, for example, GUI 800 or GUI 900, as well as the screenshots captured by the Desktop Recorder. The output from the AIDT Analyzer may be referred to as a workflow diagram, where the workflow diagram describes each step taken by the user as reflected by the keyboard activity detected by the Desktop Recorder. An exemplary workflow diagram 1100 is illustrated in FIG. 11. The workflow diagram may be generated as, for example, a MS Visio document. Alternatively, the workflow diagram may be embedded into parts of a process design document and/or solution design document.

The output(s) of the AIDT Analyzer are then transmitted to a Robot Process Automation (RPA) tool to implement the automation. The RPA tool is responsible for receiving the workflow diagram, identify the automatable tasks, and generate the software code for implementing the automatable tasks. After the software code for implementing the automatable tasks is generated, the RPA tool may execute the software code to implement the automatable tasks. Going forward, the user may utilize the generated software code to run future iterations of the automatable tasks.

According to some embodiments, the AIDT Analyzer may generate the workflow diagram and recommend one or more RPA tools for implementing the automation described in the workflow diagram. Each RPA tool available to the AIDT Analyzer may be monitored and graded for each instance of automation the RPA tool implements historically. By monitoring and grading the RPA tool's performance, the AIDT Analyzer may create a record that tracks the different RPA tool's performance in automating specific types of tasks, or task types, so that eventually workflow diagrams may be assigned to the RPA tool having a history of high performance in automating the specific tasks described in the workflow diagram. Therefore the assignment of workflow diagram to known RPA tools may be made according to a set of rules developed by the AIDT Analyzer to assign workflow diagrams to the RPA tool having a history of high performance in automating the specific tasks described in the workflow diagram.

According to some embodiments, the AIDT Analyzer may recommend one or more RPA tools for implementing automation for processes detected by the AIDT Analyzer without the specific input of the workflow diagram. Each RPA tool available to the AIDT Analyzer may be monitored and graded for each instance of automation the RPA tool implements historically. By monitoring and grading the RPA tool's performance, the AIDT Analyzer may create a record that tracks the different RPA tool's performance in automating specific types of tasks, or task types, so that eventually workflow diagrams may be assigned to the RPA tool having a history of high performance in automating the specific tasks detected by the AIDT Analyzer. The assignment of workflow diagram to known RPA tools may accordingly be made according to a set of rules developed by the AIDT Analyzer to assign workflow diagrams to the RPA tool having a history of high performance in automating the specific tasks detected by the AIDT Analyzer.

FIG. 1 illustrates exemplary system architecture for an application platform system 100 that includes component devices for implementing the described features of the AIDT 150. Application platform system 100 includes an application server 140 configured to include the hardware, software, and/or middleware for operating the AIDT 150. Application server 140 is shown to include a processor 141, a memory 144, a communication interface 142, and a database interface 143.

Application platform system 100 further includes a database library 120 configured to store application data such as the automation rules described by table 1200 in FIG. 12. The database library 120 is configured to provide data to the AIDT 150 either directly, or through a network 130, via the database interface 143. The data stored on the database library 120 may include a list of enterprise process steps recorded by a desktop recorder, such as the desktop recorder described in FIG. 3. In addition, the database library 120 may store enterprise process descriptions that describe a known list of actions that are included for known enterprise processes. For example, the database library 120 may identify a first enterprise process (e.g., human resources process for updating employee paid time off calculation) and describe each known step included to accomplish the first enterprise process. The enterprise process descriptions stored in the database library 120 may later be referenced to recognize an enterprise process in progress, and/or recognize a recorded enterprise process for automation.

The application platform system 100 communicates with any number and type of communication devices 110, where communication device 110 may include well known computing systems, environments, and/or configurations that may be suitable for implementing features of the AIDT 150 such as, but are not limited to, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like. FIG. 1 shows that the communication device 110 includes a processor 111, a memory 114 configured to store the instructions for operating a web application browser, an input/output device 113, and a communication interface 112. A user operating the communication device 110 may run the web application browser to access the AIDT 150 running on the application server 140. In addition or alternatively, the AIDT 150 and corresponding data for operating the AIDT 150 may be installed on a user's computing device (e.g., communication device 110) to run locally when a network connection to network 130 is not available or when enhanced security measures are required for isolating the user's computing device from external influences.

AIDT 150 may be a representation of software, hardware, circuitry, and/or middleware configured to implement features of the AIDT 150. For example, the AIDT 150 may be a web-based application operating, for example, according to a .NET framework within the application platform system 100.

More specifically, the AIDT 150 may include a desktop recorder circuitry 151, an AIDT analysis report program (i.e., AIDT analyzer) circuitry 152, and a workflow diagram generator circuitry 153. Each of the desktop recorder circuitry 151, the AIDT analysis report program circuitry 152, and the workflow diagram generator circuitry 153 may be a representation of software, hardware, circuitry, and/or middleware configured to implement respective features of the AIDT 150.

Desktop recorder circuitry 151 may be configured to include desktop recording controls enabling a user (e.g., authorized user) to configure and control certain features of AIDT 150. Desktop recorder circuitry 151 may further be configured to include security controls for authenticating users to access, use, and/or configure features of the AIDT 150. Desktop recorder circuitry 151 may further be configured to include log-in controls that control a log-in process enabling the communication device 110 to log-in and access the AIDT 150 running on application server 140.

To access the AIDT 150, a user may control the communication device 110 to request access to the application server 140 hosting the AIDT 150. The access request may be transmitted to the application server 140 through the network 130, via the communication interface 112. The access request signal may be received by the application server 140 via the communication interface 142, and further received by the desktop recorder circuitry 151. Desktop recorder circuitry 151 may then control a log-in protocol by receiving and authenticating log-in credentials included in the access request signal (e.g., user name, password, authentication of the communication device 110, etc.). According to some embodiments, the desktop recorder circuitry 151 may also control a security protocol by determining the user's access level based on the log-in credentials included in the access request signal. According to some embodiments, the desktop recorder circuitry 151 may grant authenticated user's identified as having certain predetermined access levels the capability to configure features and/or attributes of the AIDT 150. After successfully passing the log-in protocol and/or security protocol, a user may be allowed to operate the AIDT 150 from the user's communication device 110.

Figure 3:
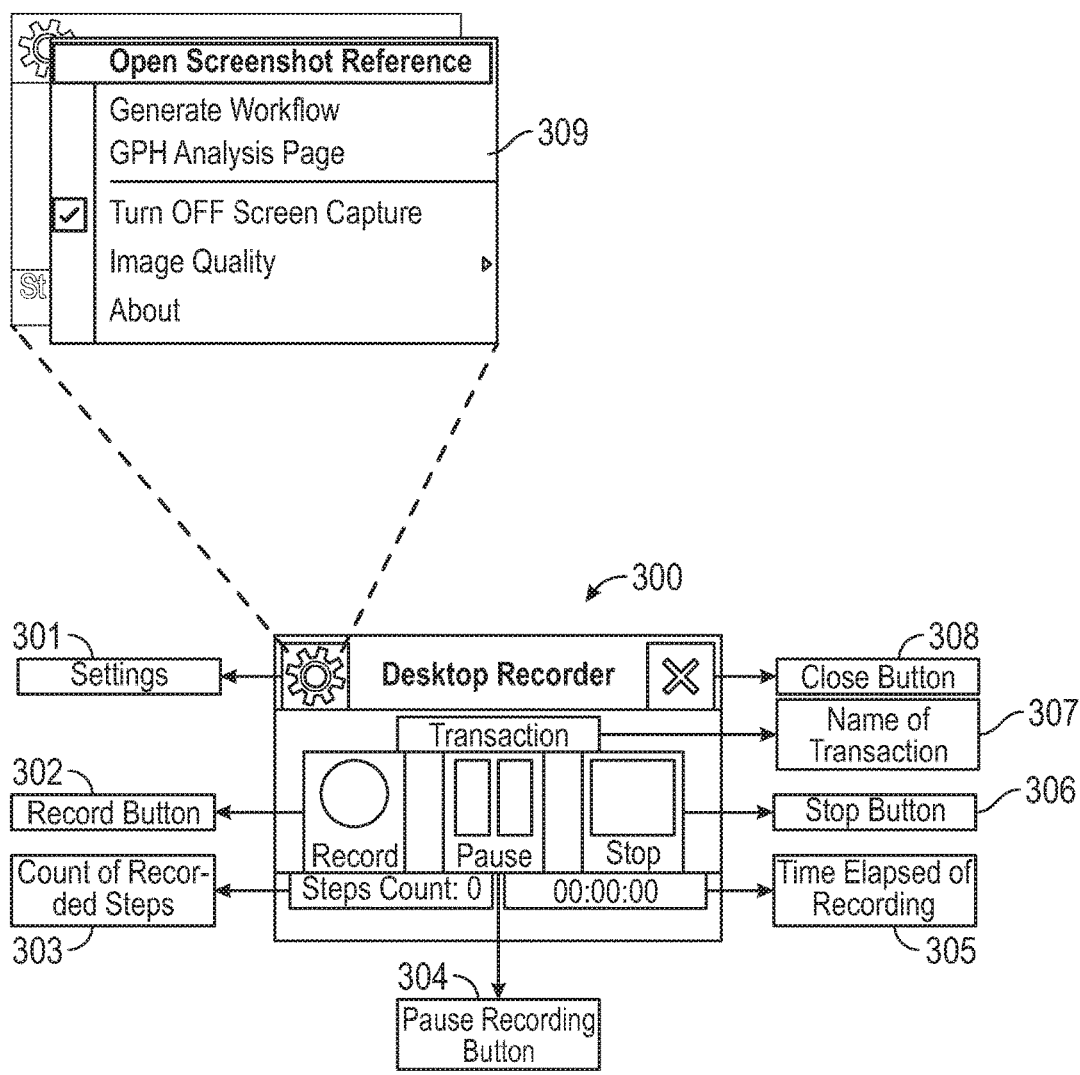
FIG. 3 illustrates an exemplary graphical user interface for the automation identification diagnostic tool.
Figure 4:
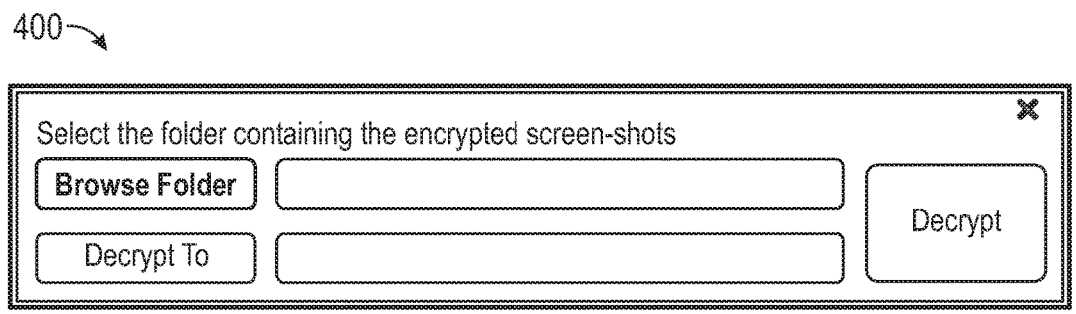
FIG. 4 illustrates another exemplary graphical user interface for the automation identification diagnostic tool.

The desktop recorder circuitry 151 may be embodied by a desktop recorder GUI 300 as illustrated in FIG. 3. The desktop recorder GUI 300 may be displayed on the screen of the communication device as the user is manually interacting with a running program (e.g., MS Excel, MS Word). The desktop recorder GUI 300 includes a settings option 301, a record button 302 for commencing recording of the user's action on the communication device 110, a step counter 303 that displays a number of user action steps recorded by the desktop recorder circuitry 151, a pause recording button 304 for pausing the current recording session, a time elapsed indicator 305 for displaying a length of time elapsed for the current recording session, a stop button 306 for stopping recording of the current recording session, a transaction display 307 for identifying the current recording session, and a close button 308 for closing out and ending the AIDT 150 running on the communication device 110.

By activating the settings option 301, the desktop recorder GUI 300 initiates display of a settings menu 309. The settings menu 309 includes an "open screenshot reference" option, a "generate workflow" option, a "global productivity hub (GPH) analysis page" option, a "turn ON/OFF screen capture" option, an "image quality" option, and an "about" option for displaying information on the AIDT 150.

Referring back to FIG. 1, the AIDT analysis report program circuitry 152 may be responsible for executing an analysis of recording session data obtained by the desktop recorder circuitry 151. The results of the analysis may be presented by a first AIDT analysis report GUI 800 illustrated in FIG. 8, or a second AIDT analysis report GUI 900 illustrated in FIG. 9. The AIDT analysis report program circuitry 152 may be caused to generate the first AIDT analysis report GUI 800 or second AIDT analysis report GUI 900 in response to a selection of the "open screenshot reference" option in the settings menu 309.

The first AIDT analysis report GUI 800 includes an option to select a date of the recording session and a transaction name of the recording session that will be analyzed. The first AIDT analysis report GUI 800 also includes a step analysis section 801 that displays a total number of steps in the recording session, a total time of the recording session, and a data graph that represents steps from the recording session that has been determined to be automatable, steps that are determined to be non-automatable, and steps that are potentially automatable and require further analysis. The first AIDT analysis report GUI 800 also includes a timeline section 803 that generates a visual color-coded timeline of the recording session that locates steps from the recording session that has been determined to be automatable, steps that are determined to be non-automatable, and steps that are potentially automatable and require further analysis. The first AIDT analysis report GUI 800 also includes a transaction details section 804 that lists and describes each recorded step from the recording session. The first AIDT analysis report GUI 800 also includes a pdf generator option 805, where selection of the pdf generator option 805 will cause the AIDT analysis report program circuitry 152 to generate a pdf document including the information presented in the first AIDT analysis report GUI 800. The first AIDT analysis report GUI 800 also includes an application summary section 802.

The second AIDT analysis report GUI 900 is an exemplary GUI according to different embodiments of the AIDT 150. The information presented by the second AIDT analysis report GUI 900 is similar to the information presented by the first AIDT analysis report GUI 900. However, in the second AIDT analysis report GUI 900 the recording session analysis information is split between a summary tab and a detailed tab. The recording session analysis information presented by selection of the summary tab in the second AIDT analysis report GUI 900 is analogous to the transaction details described by the transaction details section 804 in the first AIDT analysis report GUI 800. For example, detailed transaction GUI 1000 illustrates the second AIDT analysis report GUI 900 when the detailed tab is selected.

The AIDT analysis report program circuitry 152 may further analyze the recording session to identify processes that may be optimized by reducing a number of redundant steps. For example, the AIDT analysis report program circuitry 152 may compare multiple executions of a process and identify repetitive steps, branching, and decision points, to determine steps within the process that may be optimized by eliminating redundant steps without detriment to the overall goal of the process.

Referring back to FIG. 1, the workflow diagram generator 153 is responsible for generating a workflow diagram that describes each step within the recording session. The workflow diagram may be generated in a text document, visual document, or other viewable electronic document format. An exemplary workflow diagram 1100 is illustrated in FIG. 11. The workflow diagram generator 153 may generate the workflow diagram 1100 in response to a selection of the "generate workflow" option in the settings menu 309. In addition to the sequential workflow provided by the workflow diagram 1100, the workflow diagram generator 153 may generate other workflow diagrams that include decision trees and/or loops to identify repetitive tasks that are captured during the recording session.

To generate the workflow diagram, the workflow diagram generator 153 further compares the steps described in the received recording session against previously received recording sessions and generated workflow diagrams. The historical data may relate to recording sessions that captured tasks included in the currently received recording session. The historical data may also relate, or not relate, to the same user recorded in the currently received recording session. The historical data may further be relied upon, in addition to the steps in the currently received recording session, to calculate an average handling time (AHT) for a task (e.g., inputting a set of invoices into an invoice chart in Excel, or calculating employee's overtime work amount from timesheets) described by the currently received recording session.

In addition or alternatively, the workflow diagram generator 153 generates automation code without specifically formatting the automation code into the workflow diagram. The automation code similarly is generated based on the historical data included in the recording session data from previous recording sessions. After identifying a specific process for automation, the workflow diagram generator 153 may first determine a recommended RPA tool for automating the specific process. Then, the workflow diagram generator 153 may generate the automation code in a data format known to be executable by the recommended RPA tool. After the automation code is generated by the workflow diagram generator 153, the AIDT 150 transmits the automation code to the recommended RPA tool for automation of the process described in the automation code.

Figure 2:
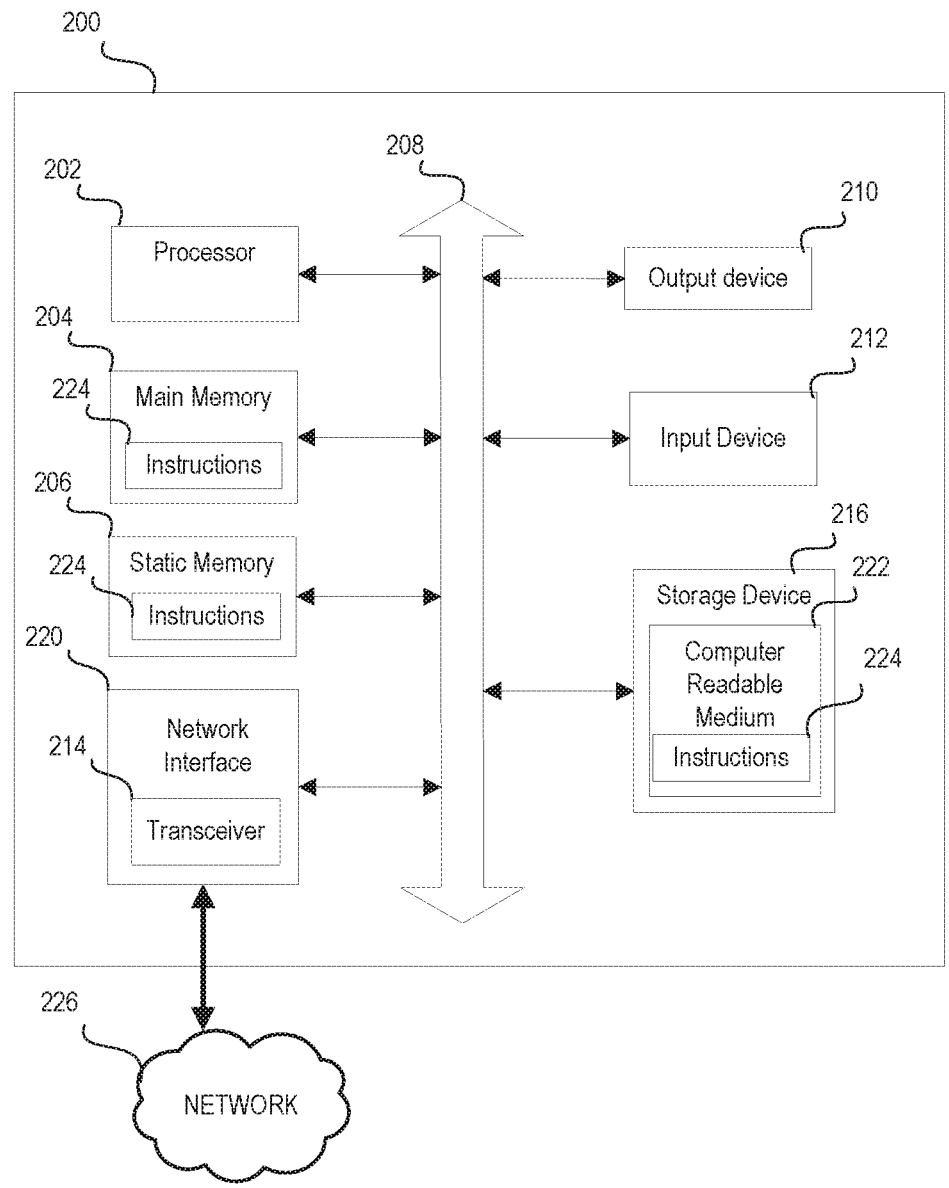
FIG. 2 illustrates a block diagram of an exemplary computer architecture for a device in the exemplary application platform system illustrated in FIG. 1.

Each of communication device 110, database library 120, and application server 140 may include one or more components of computer system 200 illustrated in FIG. 2. FIG. 2 illustrates exemplary computer architecture for computer system 200. Computer system 200 includes a network interface 220 that allows communication with other computers via a network 226, where network 226 may be represented by network 130 in FIG. 1. Network 226 may be any suitable network and may support any appropriate protocol suitable for communication to computer system 200. In an embodiment, network 226 may support wireless communications. In another embodiment, network 226 may support hard-wired communications, such as a telephone line or cable. In another embodiment, network 226 may support the Ethernet IEEE (Institute of Electrical and Electronics Engineers) 802.3x specification. In another embodiment, network 226 may be the Internet and may support IP (Internet Protocol). In another embodiment, network 226 may be a LAN or a WAN. In another embodiment, network 226 may be a hotspot service provider network. In another embodiment, network 226 may be an intranet. In another embodiment, network 226 may be a GPRS (General Packet Radio Service) network. In another embodiment, network 226 may be any appropriate cellular data network or cell-based radio network technology. In another embodiment, network 226 may be an IEEE 802.11 wireless network. In still another embodiment, network 226 may be any suitable network or combination of networks. Although one network 226 is shown in FIG. 2, network 226 may be representative of any number of networks (of the same or different types) that may be utilized.

The computer system 200 may also include a processor 202, a main memory 204, a static memory 206, an output device 210 (e.g., a display or speaker), an input device 212, and a storage device 216, communicating via a bus 208.

Processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 202 executes instructions 224 stored on one or more of the main memory 204, static memory 206, or storage device 215. Processor 202 may also include portions of the computer system 200 that control the operation of the entire computer system 200. Processor 202 may also represent a controller that organizes data and program storage in memory and transfers data and other information between the various parts of the computer system 200.

Processor 202 is configured to receive input data and/or user commands through input device 212. Input device 212 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computer system 200 and control operation of computer system 200 and/or operation of the AIDT 150. Input device 212 as illustrated in FIG. 2 may be representative of any number and type of input devices.

Processor 202 may also communicate with other computer systems via network 226 to receive instructions 224, where processor 202 may control the storage of such instructions 224 into any one or more of the main memory 204 (e.g., random access memory (RAM)), static memory 206 (e.g., read only memory (ROM)), or the storage device 216. Processor 202 may then read and execute instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that make up the AIDT 150.

Although computer system 200 is represented in FIG. 2 as a single processor 202 and a single bus 208, the disclosed embodiments applies equally to computer systems that may have multiple processors and to computer systems that may have multiple busses with some or all performing different functions in different ways.

Storage device 216 represents one or more mechanisms for storing data. For example, storage device 216 may include a computer readable medium 222 such as read-only memory (ROM), RAM, non-volatile storage media, optical storage media, flash memory devices, and/or other machine-readable media. In other embodiments, any appropriate type of storage device may be used. Although only one storage device 216 is shown, multiple storage devices and multiple types of storage devices may be present. Further, although computer system 200 is drawn to contain the storage device 216, it may be distributed across other computer systems that are in communication with computer system 200, such as a server in communication with computer system 200. For example, when computer system 200 is representative of communication device 110, storage device 216 may be distributed across to application server 140 when communication device 110 is in communication with application server 140 during operation of the AIDT 150.

Storage device 216 may include a controller (not shown) and a computer readable medium 222 having instructions 224 capable of being executed by processor 202 to carry out functions of the AIDT 150. In another embodiment, some or all of the functions are carried out via hardware in lieu of a processor-based system. In one embodiment, the controller included in storage device 216 is a web application browser, but in other embodiments the controller may be a database system, a file system, an electronic mail system, a media manager, an image manager, or may include any other functions capable of accessing data items. Storage device 216 may also contain additional software and data (not shown), for implementing described features.

Output device 210 is configured to present information to the user. For example, output device 210 may be a display such as a liquid crystal display (LCD), a gas or plasma-based flat-panel display, or a traditional cathode-ray tube (CRT) display or other well-known type of display in the art of computer hardware. Accordingly in some embodiments, output device 210 displays a user interface. In other embodiments, output device 210 may be a speaker configured to output audible information to the user. In still other embodiments, any combination of output devices may be represented by the output device 210.

Network interface 220 provides the computer system 200 with connectivity to the network 226 through any compatible communications protocol. Network interface 220 sends and/or receives data from the network 226 via a wireless or wired transceiver 214. Transceiver 214 may be a cellular frequency, radio frequency (RF), infrared (IR) or any of a number of known wireless or wired transmission systems capable of communicating with network 226 or other computer device having some or all of the features of computer system 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller). Network interface 220 as illustrated in FIG. 2 may be representative of a single network interface card configured to communicate with one or more different data sources. For example, according to some embodiments the communications interface 142 (i.e., a communications network interface) and database interface 143 (i.e., a database network interface) may be separate network interface card hardware components dedicated to communicating with different data sources. In other embodiments, communications interface 142 and database interface 143 may be representative of a single network interface card hardware component configured to communicate with different data sources.

Computer system 200 may be implemented using any suitable hardware and/or software, such as a personal computer or other electronic computing device. In addition, computer system 200 may also be a portable computer, laptop, tablet or notebook computer, PDA, pocket computer, appliance, telephone, server computer device, or mainframe computer.

Figure 13:
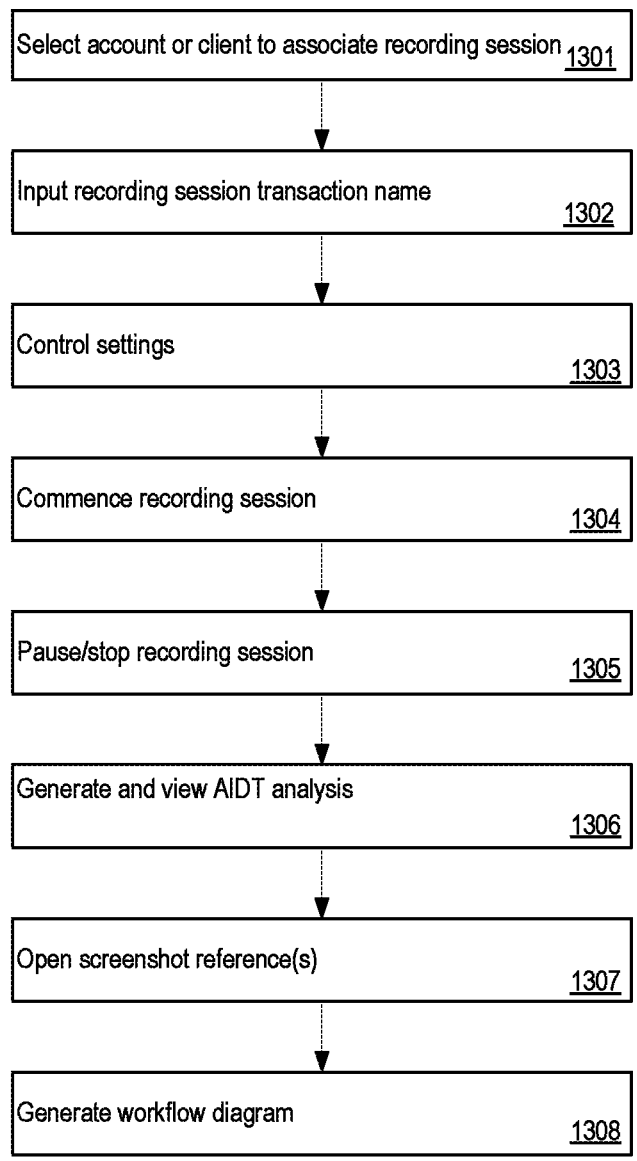
FIG. 13 illustrates an exemplary flow diagram of logic describing an operation of the automation identification diagnostic tool.

FIG. 13 illustrates a flow diagram 1300 of logic describing an exemplary operation of the AIDT 150 after opening and running the AIDT 150 on communication device 110. The desktop recorder GUI 300 may be displayed on the desktop screen of the communication device 110.

An agent selects their account or client name from a list of available names, or input a new account or client name to associate the current recording session (1301). By receiving the agent identification information, the AIDT 150 identifies the agent for subsequent processing.

The agent may further input a recording session transaction name for the current recording session (1302). By receiving the recording session transaction name, the AIDT 150 may assign subsequently recorded information under the recording session transaction name.

Figure 14:
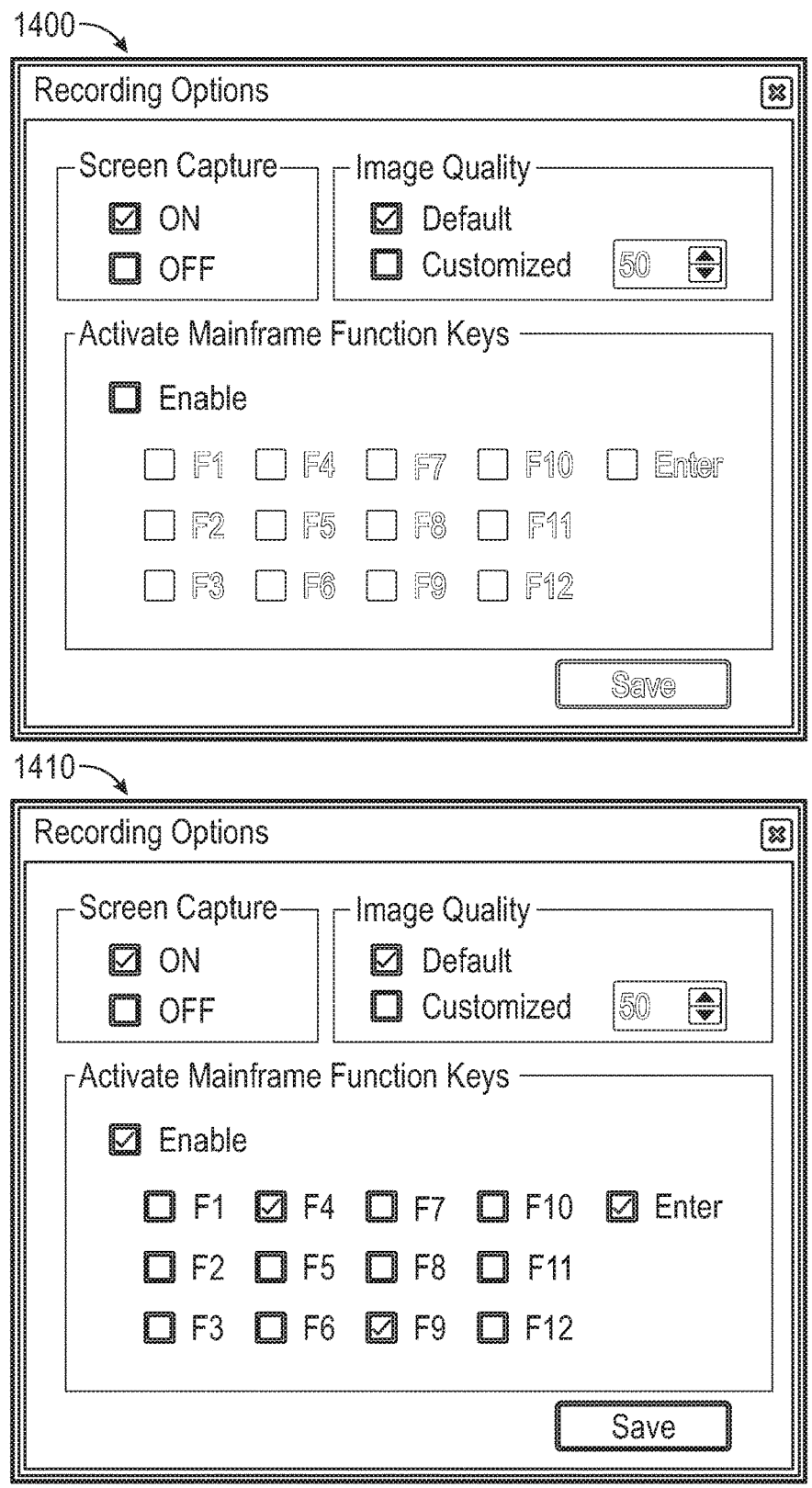
FIG. 14 illustrates another exemplary graphical user interface of the automation identification diagnostic tool.

The agent controls settings of the AIDT 150 by selecting the settings option 301 on the desktop recorder GUI 300 (1303). For example, by selecting the settings option 301 and further selecting the "recordings options," the agent may customize recording options for the recording session. Recording options GUI 1400 illustrated in FIG. 14 displays exemplary recording options that may be available including a screen capture on or off option, image quality selection option, and a mainframe function keys activation option. Recording options GUI 1410 displays the available customization under the mainframe function keys activation option in more detail.

The agent commences the recording session to record the agent's action with a program running on the communication device 110, and also to capture desktop screenshots when this option is activated (1304). The recording session may be commenced by selecting the record button 302 on the desktop recorder GUI 300. The screenshots captured during the recording session may be encrypted and stored at a data storage location (e.g., database library 120). A cognitive bot running as part of the AIDT 150 may control the capture of screenshots to include only a surrounding area around the mouse click, instead of capturing the entire desktop, as described herein.

After a passage of time, the agent may select either the pause recording button 304 or the stop button 306 on the desktop recorder GUI 300 to cease recoding of the recording session (1305). Detecting selection of either the pause recording button 304 or the stop button 306 causes the AIDT 150 to cease recording the recording session.

The agent generates and views an AIDT analysis report on the recording session by, for example, selecting the global productivity hub (GPH) analysis page option or the equivalent from the settings menu 309 on the desktop recorder GUI 300 (1306). The AIDT analysis report for the recording session may be generated to embody the first AIDT analysis report GUI 800 or second AIDT analysis report GUI 900 described herein.

Figure 5:
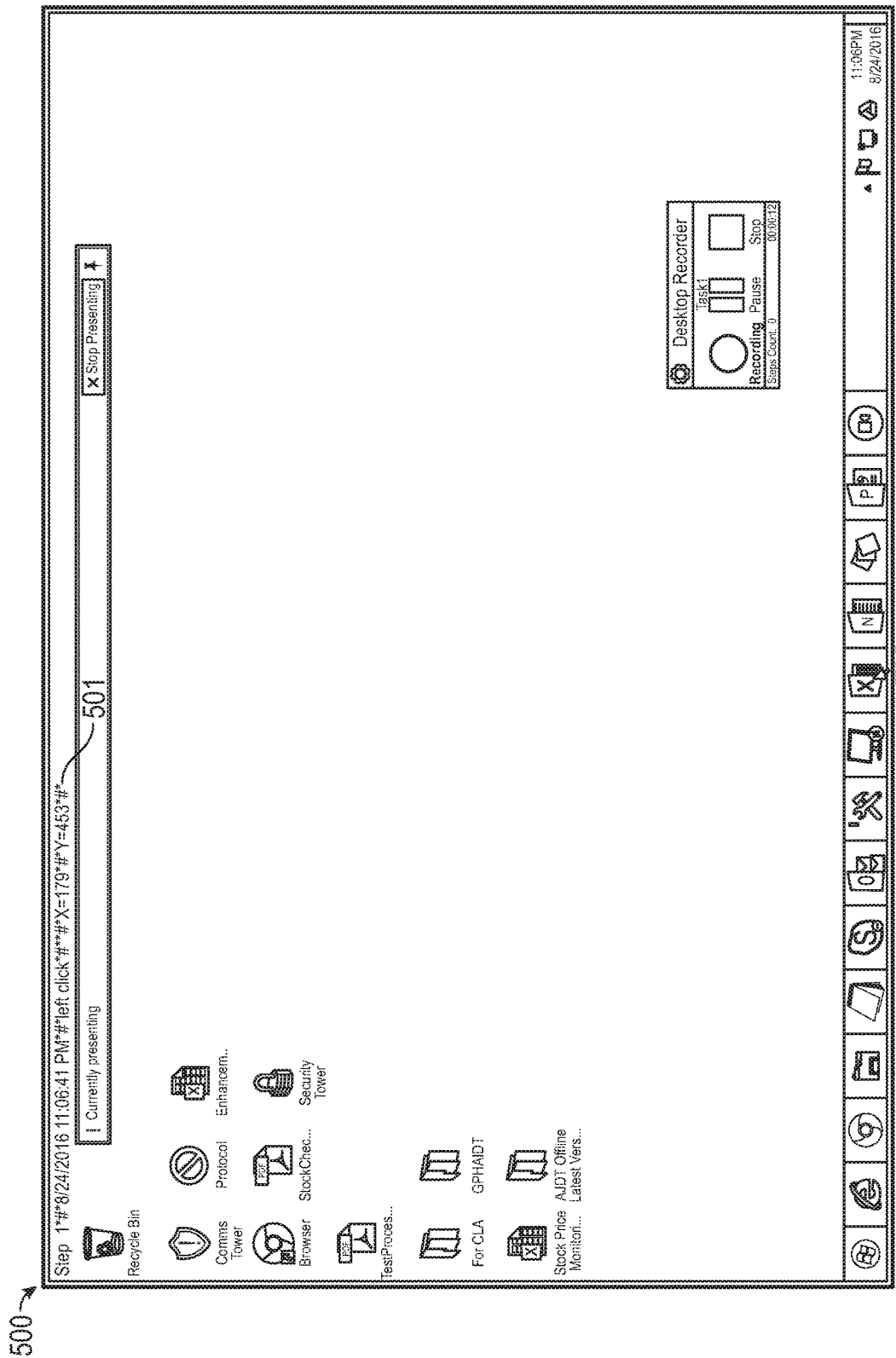
FIG. 5 illustrates an exemplary screenshot captured by the automation identification diagnostic tool.
Figure 6:
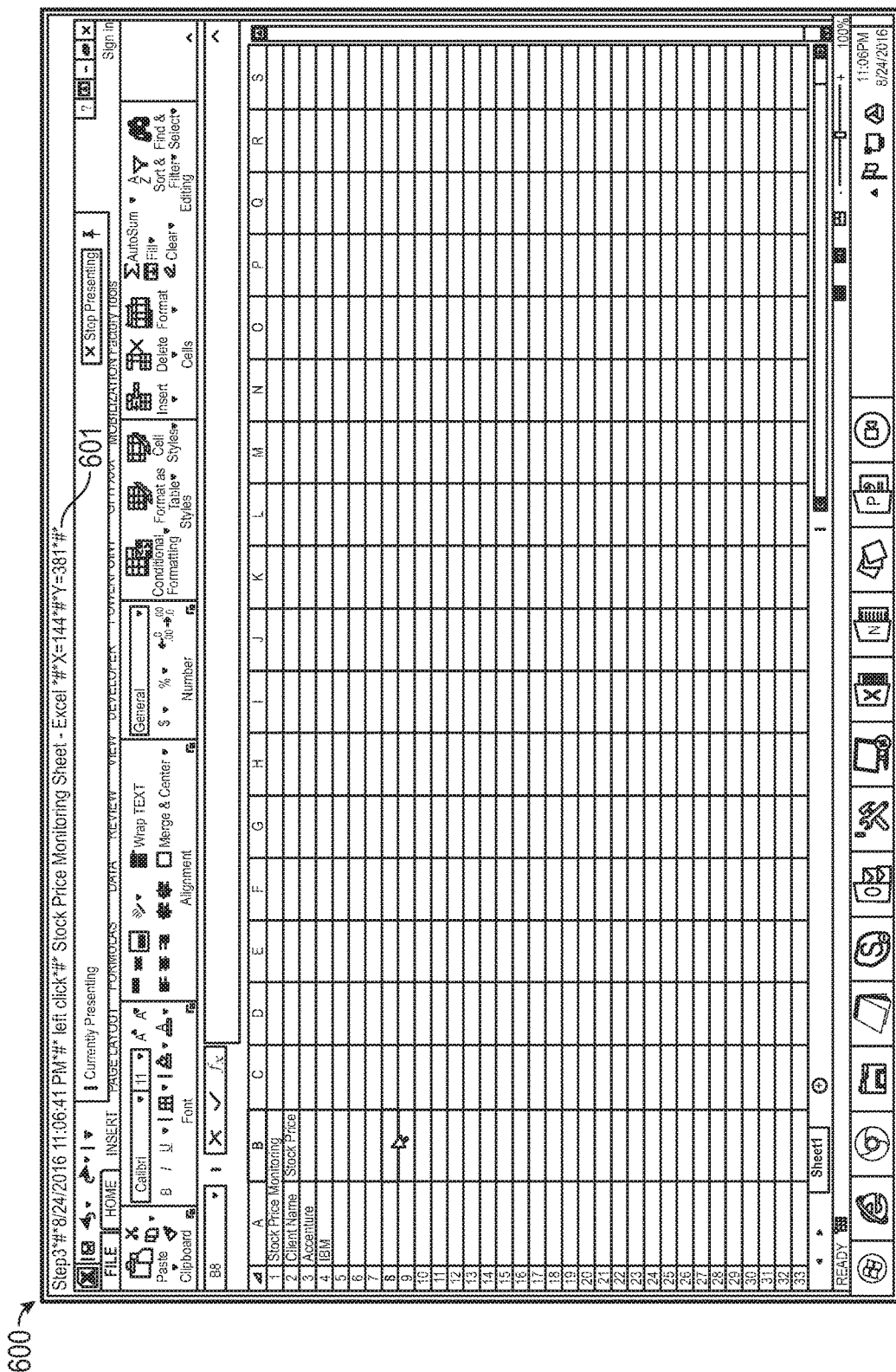
FIG. 6 illustrates another exemplary screenshot captured by the automation identification diagnostic tool.
Figure 7:
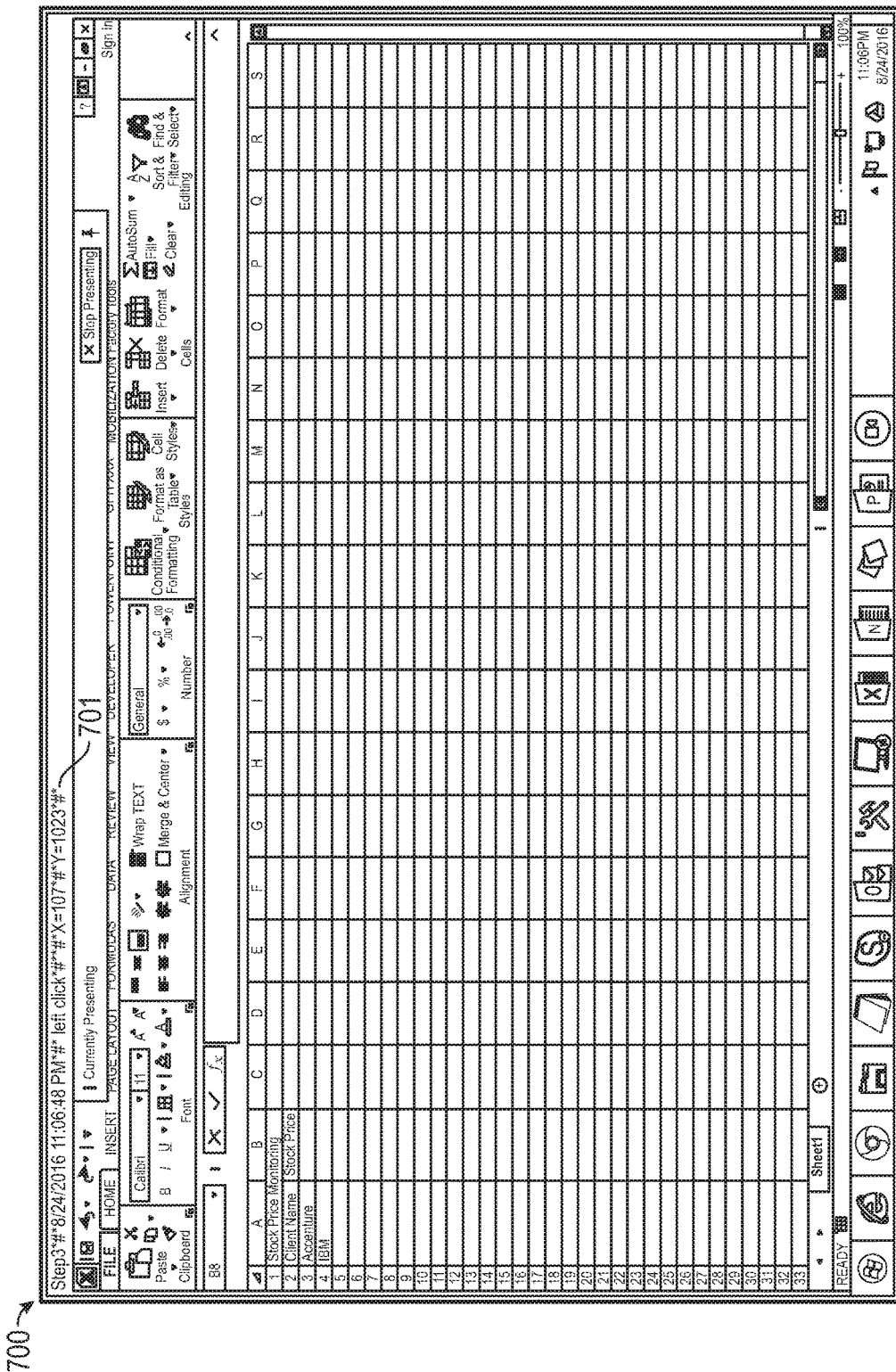
FIG. 7 illustrates another exemplary screenshot captured by the automation identification diagnostic tool.

The agent may open screenshot references that have been captured and saved by selecting the open screenshot reference option or the equivalent from the settings menu 309 on the desktop recorder GUI 300 (1307). In response to selecting the open screenshot reference option, a screenshot selection GUI 400 may be displayed that includes an option to browse for the screenshot references from their storage location, and an option to decrypt the selected screenshot references and identify a storage location for the decrypted screenshot reference. FIG. 5 illustrates a first exemplary screenshot 500 of the recording session, which includes the desktop recorder GUI 300. The first exemplary screenshot 500 also includes an information section 501 that describes a step (e.g., step 1) associated with the first exemplary screenshot 500, a time and date the first exemplary screenshot 500 was captured, a description of the agent's action that caused the screenshot to be captured (e.g., left [mouse] click), and an x and y coordinate on the display screen that identifies the location of the action (e.g., left [mouse] click) that caused the screenshot to be captured. FIG. 6 illustrates a second exemplary screenshot 600 of the recording session. The second exemplary screenshot 600 also includes an information section 601 that describes a step (e.g., step 2) associated with the second exemplary screenshot 600, a time and date the second exemplary screenshot 600 was captured, a description of the agent's action that caused the second exemplary screenshot 600 to be captured (e.g., left [mouse] click), the name of the file and program in which the agent's action was received (e.g., Stock price monitoring sheet—Excel), and an x and y coordinate on the display screen that identifies the location of the action (e.g., left [mouse] click) that caused the second exemplary screenshot 600 to be captured. FIG. 7 illustrates a third exemplary screenshot 700 of the recording session. The third exemplary screenshot 700 also includes an information section 701 that describes a step (e.g., step 3) associated with the third exemplary screenshot 700, a time and date the third exemplary screenshot 700 was captured, a description of the agent's action that caused the third exemplary screenshot 700 to be captured (e.g., left [mouse] click), and an x and y coordinate on the display screen that identifies the location of the action (e.g., left [mouse] click) that caused the third exemplary screenshot 700 to be captured.

Referring back to the flow diagram 1300, a workflow diagram may be generated by selection of the "generate workflow" option in the settings menu (1308). FIG. 11 illustrates the exemplary workflow diagram 1100 that may be generated by the workflow diagram generator 153 of the AIDT 150. The workflow diagram generator 153 may further create one or more of a process design document (PDD), a process design instruction (PDI), an object design instruction (ODI), a solution design instruction (SDI), or a solution design document (SDD). The workflow diagram may be a collection of visual data and corresponding descriptions that are embedded into the PDD and SDD.

The workflow diagram may then be transmitted to an RPA tool, where the RPA tool receives the workflow diagram, extracts information describing a process detected from the user's interactions with the application from the recording session, and generates an automated process for a process described in the workflow diagram (1309). The AIDT 150 may further suggest a particular RPA tool for automating the process described in the workflow diagram based on historical data describing the performance of available RPA tools in automating the process described in the workflow diagram. The AIDT 150 may select the available RPA tool with the best past performance in automating the process described in the workflow diagram.

Figure 15:
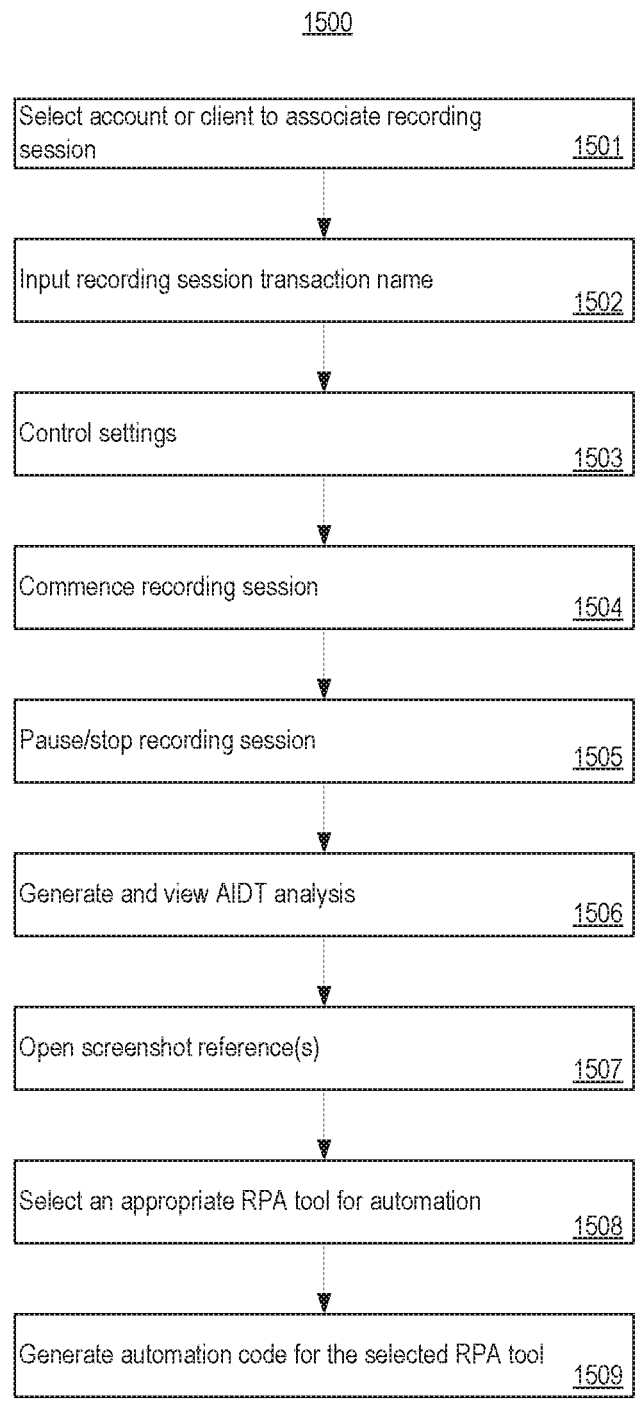
FIG. 15 illustrates another exemplary flow diagram of logic describing an operation of the automation identification diagnostic tool.

FIG. 15 illustrates a flow diagram 1500 of logic describing another exemplary operation of the AIDT 150 after opening and running the AIDT 150 on communication device 110. According to the flow diagram 1500, the AIDT 150 does not generate a workflow diagram, and an RPA tool may generate an automation process without receiving the workflow diagram as an input. The desktop recorder GUI 300 may be displayed on a desktop screen of the communication device 110.

An agent may select their account or client name from a list of available names, or input a new account or client name to associate the current recording session (1501). By receiving the agent identification information, the AIDT 150 identifies the agent for subsequent processing.

The agent may further input a recording session transaction name for the current recording session (1502). By receiving the recording session transaction name, the AIDT 150 may assign subsequently recorded information under the recording session transaction name.

The agent controls settings of the AIDT 150 by selecting the settings option 301 on the desktop recorder GUI 300 (1503). For example, by selecting the settings option 301 and further selecting the "recordings options," the agent may customize recording options for the recording session. Recording options GUI 1400 illustrated in FIG. 14 displays exemplary recording options that may be available including a screen capture on or off option, image quality selection option, and a mainframe function keys activation option. Recording options GUI 1410 displays the available customization under the mainframe function keys activation option in more detail.

The agent commences the recording session to record the agent's action with a program running on the communication device 110, and also to capture desktop screenshots when this option is activated (1504). The recording session may be commenced by selecting the record button 302 on the desktop recorder GUI 300. The screenshots captured during the recording session may be encrypted and stored at a data storage location (e.g., database library 120). A cognitive bot running as part of the AIDT 150 may control the capture of screenshots to include only a surrounding area around the mouse click, instead of capturing the entire desktop, as described herein.

After a passage of time, the agent may select either the pause recording button 304 or the stop button 306 on the desktop recorder GUI 300 to cease recoding of the recording session (1505). Detecting selection of either the pause recording button 304 or the stop button 306 causes the AIDT 150 to cease recording the recording session.

The agent generates and views an AIDT analysis report on the recording session by, for example, selecting the global productivity hub (GPH) analysis page option or the equivalent from the settings menu 309 on the desktop recorder GUI 300 (1506). The AIDT analysis report for the recording session may be generated to embody the first AIDT analysis report GUI 800 or second AIDT analysis report GUI 900 described herein.

The agent opens screenshot references that have been captured and saved by selecting the open screenshot reference option or the equivalent from the settings menu 309 on the desktop recorder GUI 300 (1307). In response to selecting the open screenshot reference option, a screenshot selection GUI 400 may be displayed that includes an option to browse for the screenshot references from their storage location, and an option to decrypt the selected screenshot references and identify a storage location for the decrypted screenshot reference. FIG. 5 illustrates a first exemplary screenshot 500 of the recording session. The first exemplary screenshot 500 also includes an information section 501 that describes a step (e.g., step 1) associated with the first exemplary screenshot 500, a time and date the first exemplary screenshot 500 was captured, a description of the agent's action that caused the screenshot to be captured (e.g., left [mouse] click), and an x and y coordinate on the display screen that identifies the location of the action (e.g., left [mouse] click) that caused the screenshot to be captured. FIG. 6 illustrates a second exemplary screenshot 600 of the recording session. The second exemplary screenshot 600 also includes an information section 601 that describes a step (e.g., step 2) associated with the second exemplary screenshot 600, a time and date the second exemplary screenshot 600 was captured, a description of the agent's action that caused the second exemplary screenshot 600 to be captured (e.g., left [mouse] click), the name of the file and program in which the agent's action was received (e.g., Stock price monitoring sheet—Excel), and an x and y coordinate on the display screen that identifies the location of the action (e.g., left [mouse] click) that caused the second exemplary screenshot 600 to be captured. FIG. 7 illustrates a third exemplary screenshot 700 of the recording session. The third exemplary screenshot 700 also includes an information section 701 that describes a step (e.g., step 3) associated with the third exemplary screenshot 700, a time and date the third exemplary screenshot 700 was captured, a description of the agent's action that caused the third exemplary screenshot 700 to be captured (e.g., left [mouse] click), and an x and y coordinate on the display screen that identifies the location of the action (e.g., left [mouse] click) that caused the third exemplary screenshot 700 to be captured.

Referring back to the flow diagram 1500, the AIDT 150 selects an appropriate RPA tool for automating a process detected from the recording session data, including the recording session and the information created to generate the AIDT analysis report (1508). The AIDT 150 may select a particular RPA tool from a plurality of known RPA tools for automating a specific process described in the recording session data based on the RPA tool's historical performance in automating the specific process. This way the AIDT 150 selects the available RPA tool with a proven history of high performance in automating the specific process.

After selecting the appropriate RPA tool, the AIDT 150 generates automation code for execution by the selected RPA tool (1509). The automation code includes instructions for automating the specific process from the record session data. The automation tool may be in an RPA code format that is readable and executable by the selected RPA tool. Following the generation of the automation code, the AIDT 150 may transmit the automation code to the selected RPA tool for execution and automation of the specific process.

With the added capability provided by the AIDT 150 of monitoring a user's desktop actions and recognizing automatable processes from the monitored desktop actions, additional enterprise features related to optimizing digital desktop procedures is possible. One such feature is the installation of a desktop publishing tool (DTP tool) onto a computer desktop, similar to the desktop recorder GUI 300 shown in FIG. 3. The DTP tool is displayed as a visual tool on the computer desktop to monitor the user's actions while the user is going through steps of a known enterprise process. As the DTP tool detects the steps of the known enterprise process, a visual indicator notifies the user of each step included in the known enterprise process, and further provides an alert to the user when a step is skipped by the user. According to some embodiments, the DTP tool may communicate with the AIDT 150 to automate the skipped step when the enterprise process has previously been automated by the AIDT 150.

The DTP tool solves the problem of potential human error by effectively monitoring the user's desktop actions and alerting the user of any steps that are missed.

The DTP Tool

Figure 16:
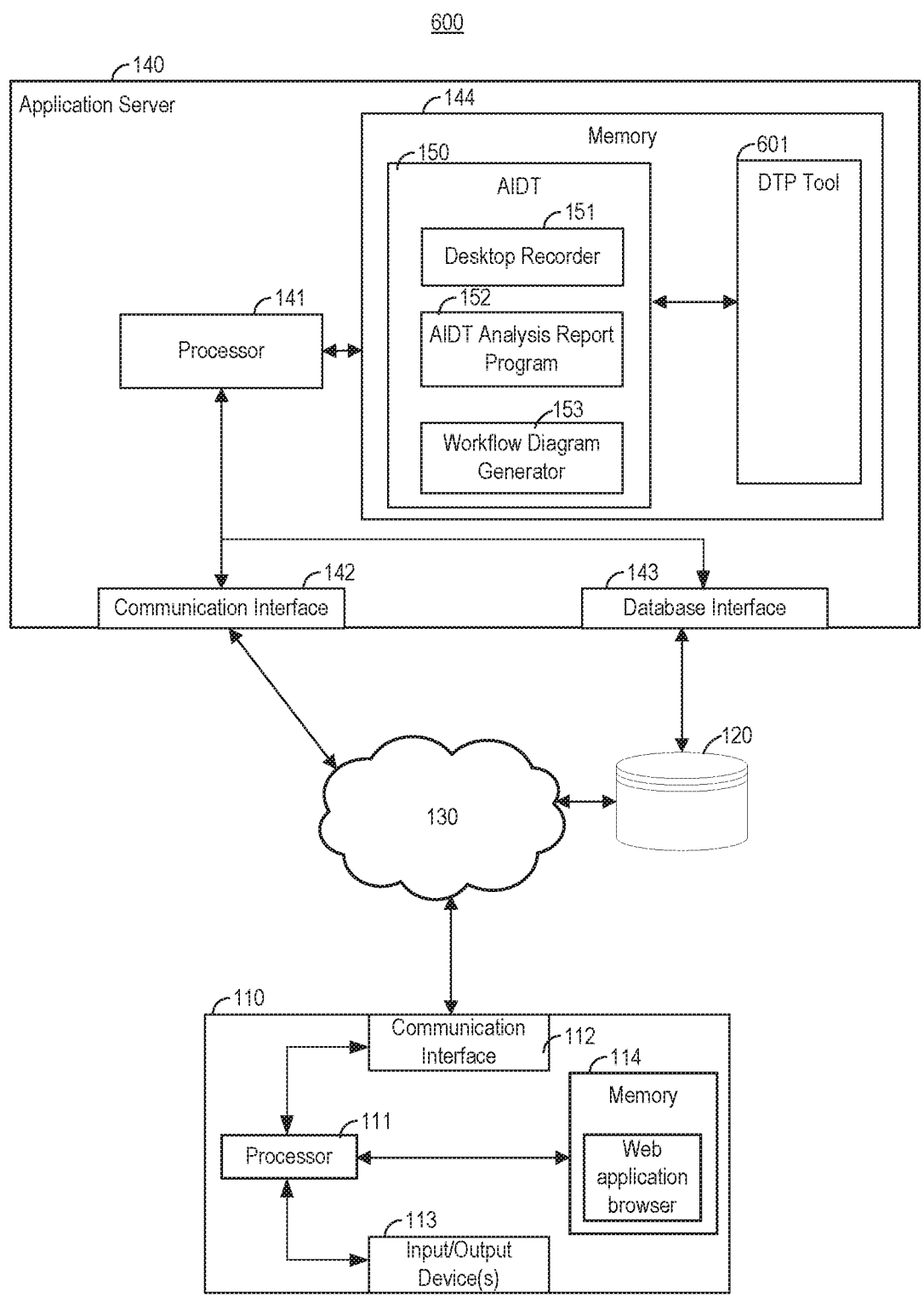
FIG. 16 illustrates the exemplary application platform system shown in FIG. 1 updated to include a desktop publishing tool.

FIG. 16 shows an exemplary system architecture for an application platform system 600 that includes component devices from the application platform system 100 that is further updated to include the DTP tool 601 working within the AIDT 150. In particular, the memory 144 has been updated to store the DTP tool 601. The DTP tool may be a representation of software, hardware, circuitry, and/or middleware configured to implement features of the DTP tool 601. For example, the DTP tool 601 may be a web-based application operating, for example, according to a .NET framework within the application platform system 600. The DTP tool 601 works together with the AIDT 150 to accomplish the monitoring, alerting, and automating features described herein. In particular, the DTP tool 601 is authorized to access recording session data and enterprise process descriptions stored on the database library 120 by the AIDT 150.

Figure 17:
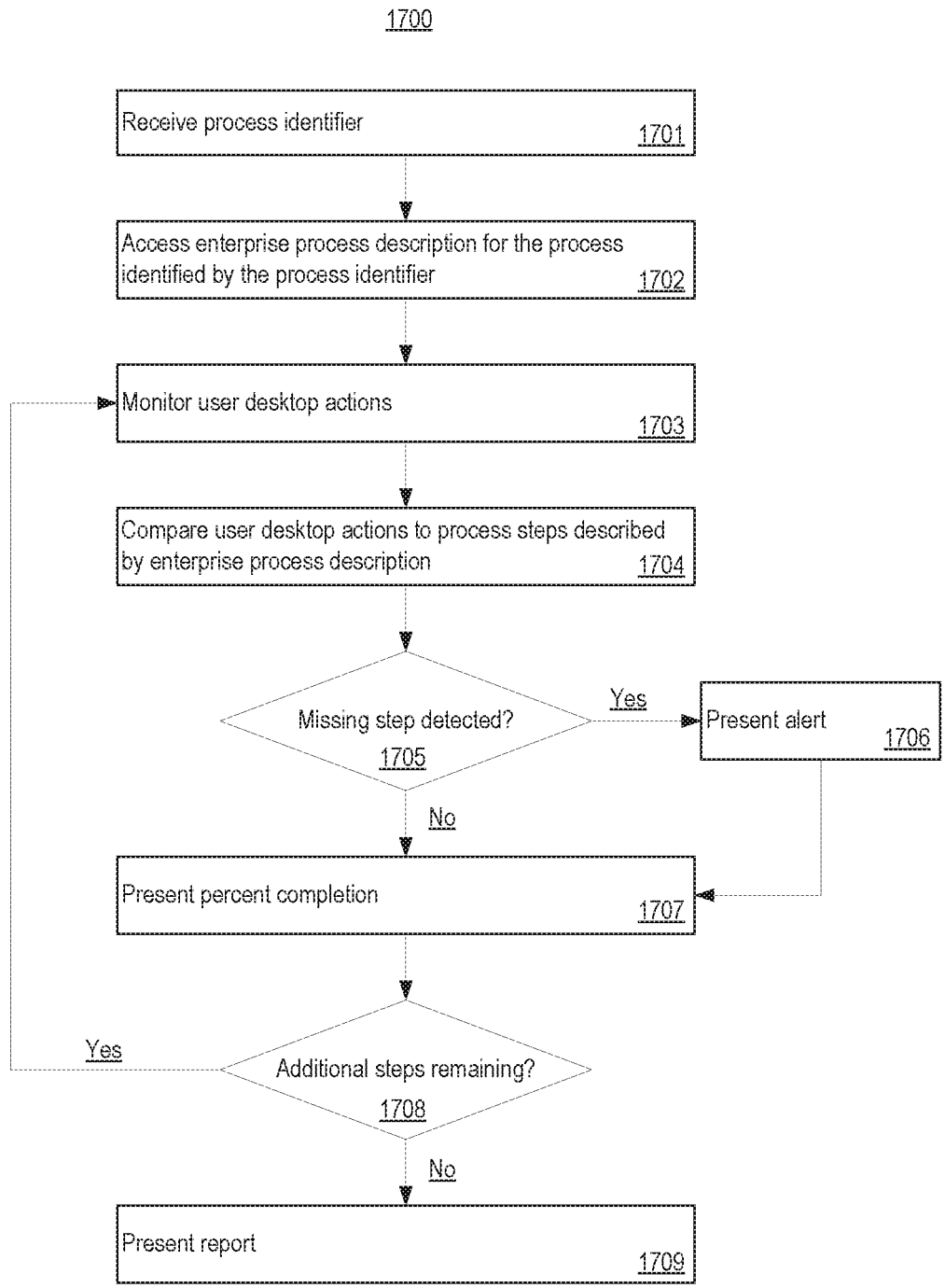
FIG. 17 illustrates a flow diagram of logic describing a process for identifying missing steps by the desktop publishing tool.
Figure 19:
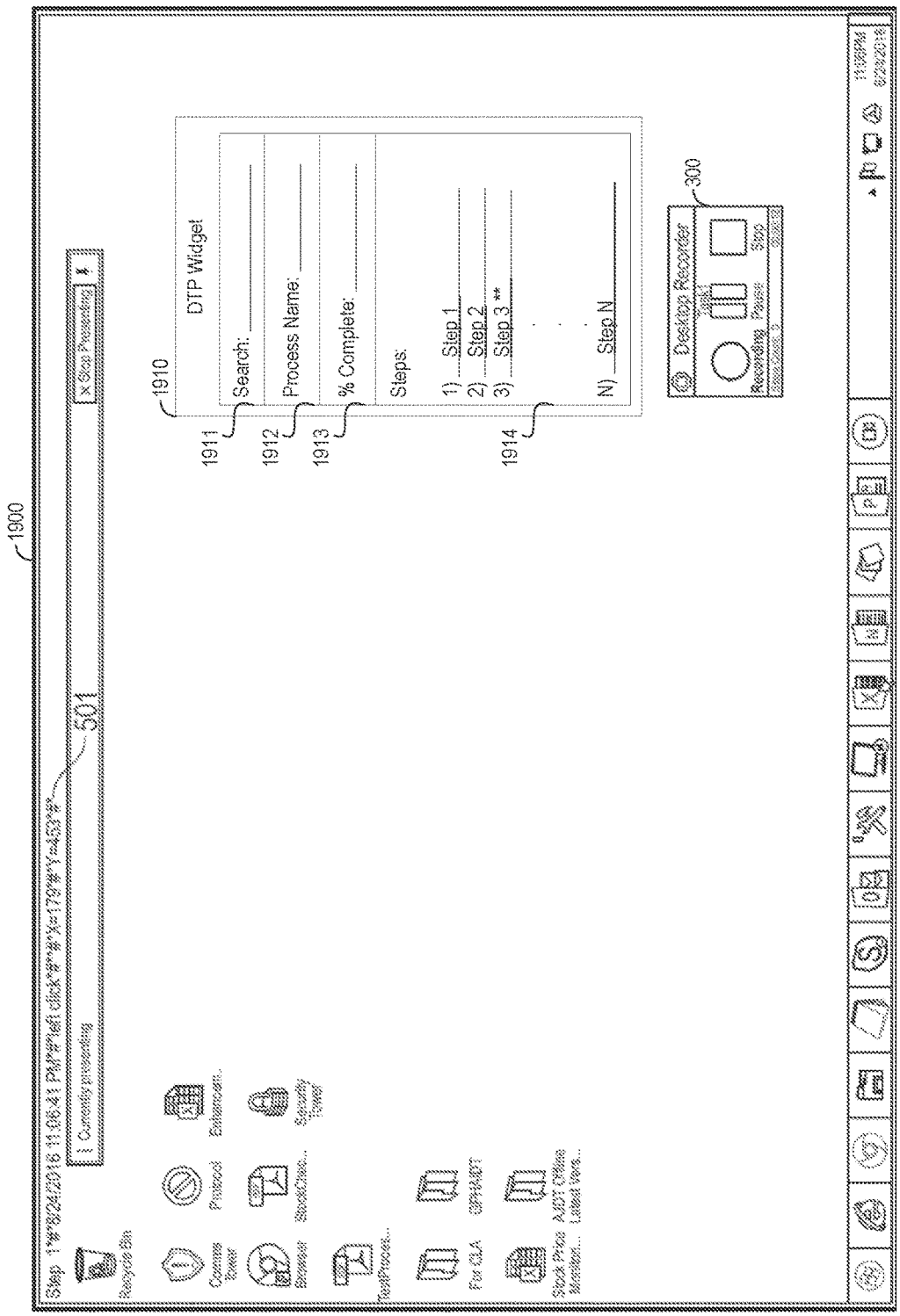
FIG. 19 illustrates an exemplary computer desktop including a desktop publishing tool widget and a desktop recorder.

FIG. 17 shows a flow diagram 1700 of logic describing an exemplary process for detecting missing steps of an enterprise process implemented by the DTP tool 601. The DTP tool 601 may be graphically represented by the DTP widget 1910 shown in the exemplary computer desktop 1900 in FIG. 19. The DTP widget 1910 is displayed on the computer desktop 1900 along with, for example, the desktop recorder GUI 300. Reference to the computer desktop 1900 is made during the description of the flow diagram 1700.

A user about to commence an enterprise process inputs a process identifier into, for example, either a search input 1911 or a process name input 1912 included in the DTP widget 1910 (1701). The process identifier is received by the DTP tool 601 through the process identifier input to the search input 1911 or process name input 1912. The process identifier may be a name (e.g., paid time off update, payroll update, or other enterprise process described by a predetermined name), a numeric identification, or other identifier for identifying a predetermined enterprise process. When the user does not know the exact process identifier, search terms may be input to the search input 1911. When the user knows the exact process identifier, the process identifier may be input directly into the process name input 1912.

The DTP tool 601 receives the process identifier and/or search terms from the process name input 1912 and/or search input 1911, respectively, and accesses the database library 120 to select a corresponding enterprise process description (1702). The enterprise process description selected from the database library 120 will include a description of the enterprise process and a list of steps known to be required for successfully accomplishing the enterprise process. After the enterprise process description is selected by the DTP tool 601, the list of steps included in the enterprise process description may be pre-populated into the step tracker 1914 included in the DTP widget 1910.

As the user then begins interacting with an application to commence the enterprise process, the DTP tool 601 monitors the user's desktop actions through the DTP widget 1910 (1703). The DTP tool 601 may control the desktop recorder GUI 300 to record the desktop actions.

The DTP tool 601 compares each monitored desktop action to the list of steps known to be included in the enterprise process description (1704). Each monitored desktop action that is determined by the DTP tool 601 to correspond to a step included in the enterprise process description based on this comparison is highlighted or otherwise displayed in the step tracker 1914.

The DTP tool 601 considers whether a step included in the enterprise process description is skipped (1705). The DTP tool 601 may determine a step has been skipped when consecutive steps from the enterprise process description are not detected by the DTP tool 601 based on the monitoring of the desktop actions.

When a missing step is detected by the DTP tool 601, an alert is presented to the user through the DTP widget 1910 (1706). The alert may be a visual alert highlighting the missing step in the step tracker 1914, or other visual alert presented through the DTP widget 1910. The step track 1914 shown in FIG. 19 highlights step 3 as being skipped by displaying double stars "**\*\***" next to the process step description.

When a missing step is not detected, the completion status of the enterprise process is updated by displaying a percent completed information in a status display 1913 of the DTP widget 1910 (1707). The percent completed information may be calculated by the DTP tool 601 as a number of enterprise process steps detected from the user's desktop actions, divided by the total number of corresponding steps included in the enterprise process description for completion of the enterprise process.

When additional steps of the enterprise process remain, the DTP tool 601 reverts back to monitoring the desktop actions (1708). When no further steps remain, the DTP tool 601 presents a completion report through the DTP widget 1910 (1709). The completion report may identify the missed steps (i.e., errors) by the user detected by the DTP tool 601 during the enterprise process.

Figure 18:
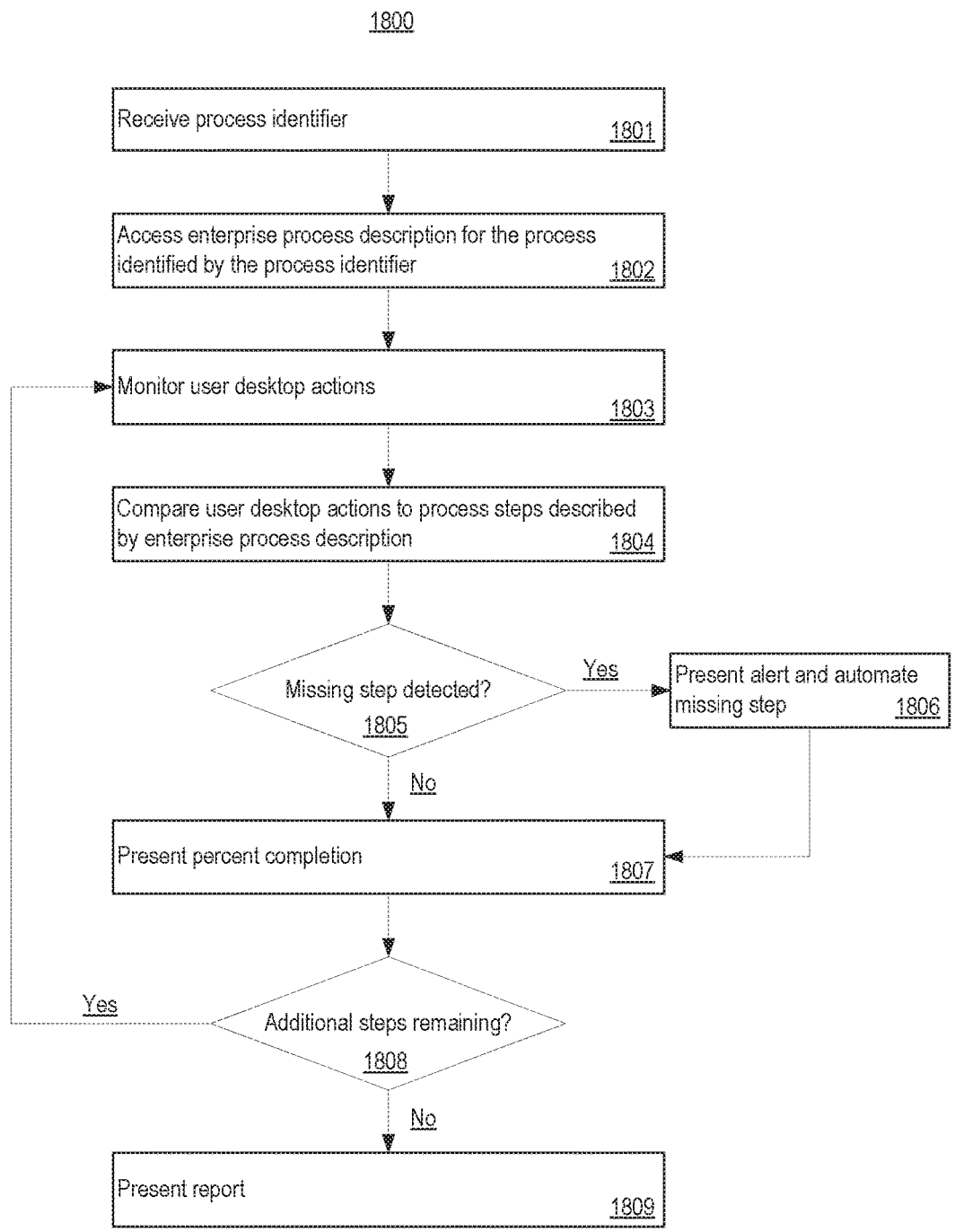
FIG. 18 illustrates a flow diagram of logic describing another process for identifying missing steps by the desktop publishing tool that includes automation of the missing steps.

FIG. 18 shows a flow diagram 1800 of logic describing an exemplary process for detecting missing steps of an enterprise process implemented by the DTP tool 601, that includes automation features provided by the AIDT 150. The DTP tool 601 may be graphically represented by the DTP widget 1910 shown in the exemplary computer desktop 1900 in FIG. 19. The DTP widget 1910 is displayed on the computer desktop 1900 along with, for example, the desktop recorder GUI 300. Reference to the computer desktop 1900 is made during the description of the flow diagram 1700.

A user about to commence an enterprise process inputs a process identifier into, for example, either a search input 1911 or a process name input 1912 included in the DTP widget 1910 (1801). The process identifier is received by the DTP tool 601 through the process identifier input to the search input 1911 or process name input 1912. The process identifier may be a name (e.g., paid time off update, payroll update, or other enterprise process described by a predetermined name), a numeric identification, or other identifier for identifying a predetermined enterprise process. When the user does not know the exact process identifier, search terms may be input to the search input 1911. When the user knows the exact process identifier, the process identifier may be input directly into the process name input 1912.

The DTP tool 601 receives the process identifier and/or search terms from the process name input 1912 and/or search input 1911, respectively, and accesses the database library 120 to select a corresponding enterprise process description (1802). The enterprise process description selected from the database library 120 will include a description of the enterprise process and a list of steps known to be required for successfully accomplishing the enterprise process. After the enterprise process description is selected by the DTP tool 601, the list of steps included in the enterprise process description may be pre-populated into the step tracker 1914 included in the DTP widget 1910.

As the user then begins interacting with an application to commence the enterprise process, the DTP tool 601 monitors the user's desktop actions through the DTP widget 1910 (1803). The DTP tool 601 may control the desktop recorder GUI 300 to record the desktop actions.

The DTP tool 601 compares each monitored desktop action to the list of steps known to be included in the enterprise process description (1804). Each monitored desktop action that is determined by the DTP tool 601 to correspond to a step included in the enterprise process description based on this comparison is highlighted or otherwise displayed in the step tracker 1914.

The DTP tool 601 considers whether a step included in the enterprise process description is skipped (1805). The DTP tool 601 may determine a step has been skipped when consecutive steps from the enterprise process description are not detected by the DTP tool 601 based on the monitoring of the desktop actions.

When a missing step is detected by the DTP tool 601, an alert is presented to the user through the DTP widget 1910 (1806). In addition or alternatively, the DTP tool 601 transmits an automation request to automatically implement the missing step to the AIDT 150. When the AIDT 150 has previously automated the enterprise process currently being monitored by the DTP tool 601, the AIDT 150 has access to the automation code for automating the steps of the enterprise process, including the missing step. Thus when the AIDT 150 receives the automation request and the missing step requested in the automation request has previously been automated by the AIDT 150, the AIDT 150 may automatically implement the missing step. This saves the user from having to go back and implement the missing step manually.

When a missing step is not detected, the completion status of the enterprise process is updated by displaying a percent completed information in a status display 1913 of the DTP widget 1910 (1807). The percent completed information may be calculated by the DTP tool as a number of enterprise process steps detected from the user's desktop actions, divided by the total number of corresponding steps included in the enterprise process description for completion of the enterprise process.

When additional steps of the enterprise process remain, the DTP tool reverts back to monitoring the desktop actions (1808). When no further steps remain, the DTP tool presents a completion report through the DTP widget 1910 (1809). The completion report may identify the missed steps (i.e., errors) by the user detected by the DTP tool during the enterprise process.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:

1. A system, comprising:
   a database interface configured to communicate with a database library storing a set of automation rules;
   a communication interface configured to communicate with a computing device;
   a processor configured to communicate with the database interface and the communication interface, the processor further configured to:
   receive, through the communication interface, a recording request to commence recording of actions interacting with a program running on the computing device;
   in response to receiving the recording request, record a recording session capturing the actions interacting with the program running on the computing device;
   detect an actionable input to the computing device during recording of the recording session;
   capture a screenshot of the actionable input in response to detecting the actionable input;
   receive, through the communication interface, a stop recording request to stop recording of the recording session;
   in response to receiving the stop record request, stop recording of the recording session;
   compare the recording session to a predetermined automation list;
   determine the actionable input is one of an automatable process or a potentially automatable process based on the comparison;
   generate a workflow diagram describing the recording session; and
   generate an analysis report graphical user interface (GUI) based on the workflow diagram, wherein the analysis report GUI includes the actionable input, wherein the actionable input is tagged in the analysis report GUI as being one of the automatable process or the potentially automatable process.

2. The system of claim 1, wherein the processor is further configured to:
    encrypt the screenshot.

3. The system of claim 1, wherein the processor is configured to capture the screenshot by capturing a predetermined area surrounding the actionable input.

4. The system of claim 1, wherein the processor is further configured to:
    analyze the recording session to determine whether the actionable input is part of a process eligible for condensing into a fewer number of actionable inputs.

5. The system of claim 1, wherein the processor is configured to:
    access, through the database interface, historical data from the database library when the actionable input is determined to have a chance of being automated; and
    compare the actionable input to the historical data to determine whether the actionable input has previously been automated.

6. The system of claim 1, wherein the predetermined automation list is stored in the database library.

7. The system of claim 1, wherein the processor is further configured to:
    transmit the workflow diagram to a robotic process automation tool for automating a task including the actionable input when the actionable input is determined to be convertible to the automatable task.

8. The system of claim 7, wherein the processor is further configured to:
    transmit the workflow diagram to the robotic process automation tool based on a historical performance of the robotic process automation tool in automating the automatable task.

9. A method for automating a task, the method comprising:
    receiving, through a communication interface, a recording request to commence recording of actions interacting with a program running on a computing device;
    in response to receiving the recording request, recording a recording session capturing the actions interacting with the program running on the computing device;
    detecting an actionable input to the computing device during recording of the recording session;
    capturing a screenshot of the actionable input in response to detecting the actionable input;
    receiving, through the communication interface, a stop record request to stop recording of the recording session;
    in response to receiving the stop record request, stopping recording of the recording session;
    comparing the recording session to a predetermined automation list;
    determining the actionable input is one of an automatable process or a potentially automatable process based on the comparison;
    generating a workflow diagram describing the recording session; and
    generating an analysis report graphical user interface (GUI) based on the workflow diagram, wherein the analysis report GUI includes the actionable input, wherein the actionable input is tagged in the analysis report GUI as being one of the automatable process or the potentially automatable process.

10. The method of claim 9, further comprising:
    encrypting the screenshot.

11. The method of claim 9, wherein capturing the screenshot comprises capturing a predetermined area surrounding the actionable input.

12. The method of claim 9, further comprising:
    analyzing the recording session to determine whether the actionable input is part of a process eligible for condensing into a fewer number of actionable inputs.

13. The method of claim 9, further comprising:
    accessing, through a database interface, historical data from a database library when the actionable input is determined to have a chance of being automated; and
    comparing the actionable input to the historical data to determine whether the actionable input has previously been automated.

14. The method of claim 9, wherein the predetermined automation list is stored in a database library.

15. The method of claim 9, further comprising:
    transmitting the workflow diagram to a robotic process automation tool for automating a task including the actionable input when the actionable input is determined to be convertible to the automatable task.

16. The method of claim 15, further comprising:
    transmitting the workflow diagram to the robotic process automation tool based on a historical performance of the robotic process automation tool in automating the automatable task.

17. A computing device for detecting an actionable input for automation, the computing device comprising:
    a communication interface configured to communicate with a web service server;
    a processor configured to communicate with the communication interface, the processor further configured to:
        execute a program enabling user interactions with the program;
        record a recording session capturing the user interactions with the program;
        detect an actionable input amongst the user interactions with the program during recording of the recording session;
        capture a screenshot of the actionable input in response to detecting the actionable input;
        stop recording the recording session when a stop recording input is detected;
        compare the recording session to a predetermined automation list;
        determine the actionable input is one of an automatable process or a potentially automatable process based on the comparison;
        generate a workflow diagram describing the recording session; and
        generate an analysis report graphical user interface (GUI) based on the workflow diagram, wherein the analysis report GUI includes the actionable input, wherein the actionable input is tagged in the analysis report GUI as being one of the automatable process or the potentially automatable process.

18. The computing device of claim 17, wherein the predetermined automation list is stored in a database library.

* * * * *